United States Patent
Shen et al.

(10) Patent No.: US 12,499,972 B2
(45) Date of Patent: Dec. 16, 2025

(54) IDENTIFYING FALSE POSITIVE VARIANTS USING A SIGNIFICANCE MODEL

(71) Applicant: GRAIL, Inc., Menlo Park, CA (US)

(72) Inventors: Ling Shen, Redwood City, CA (US); Catalin Barbacioru, Fremont, CA (US); Qinwen Liu, Fremont, CA (US)

(73) Assignee: GRAIL, Inc., Menlo Park, CA (US)

( * ) Notice: Subject to any disclaimer, the term of this patent is extended or adjusted under 35 U.S.C. 154(b) by 870 days.

(21) Appl. No.: 16/119,961

(22) Filed: Aug. 31, 2018

(65) Prior Publication Data
US 2019/0073445 A1     Mar. 7, 2019

Related U.S. Application Data

(60) Provisional application No. 62/553,593, filed on Sep. 1, 2017.

(51) Int. Cl.
| | |
|---|---|
| *G16B 30/00* | (2019.01) |
| *C12Q 1/6869* | (2018.01) |
| *G06N 20/00* | (2019.01) |
| *G16B 20/20* | (2019.01) |
| *G16B 30/10* | (2019.01) |
| *G16B 40/00* | (2019.01) |
| *G16B 40/20* | (2019.01) |

(52) U.S. Cl.
CPC ........... *G16B 30/00* (2019.02); *C12Q 1/6869* (2013.01); *G06N 20/00* (2019.01); *G16B 20/20* (2019.02); *G16B 40/00* (2019.02); *G16B 40/20* (2019.02); *G16B 30/10* (2019.02)

(58) Field of Classification Search
None
See application file for complete search history.

(56) References Cited

FOREIGN PATENT DOCUMENTS

WO    WO 2015/184404 A1    12/2015

OTHER PUBLICATIONS

Chandrananda et al Investigating and Correcting Plasma DNA Sequencing Coverage Bias to Enhance Aneuploidy Discovery, PLOS One Jan. 2014 | vol. 9 | Issue 1 | e86993 Jan. 29, 2014.*
Edgar et al Error filtering, pair assembly and error correction for next-generation sequencing reads Bioinformatics, 31(21), 2015, 3476-3482 doi: 10.1093/bioinformatics/btv401 Advance Access Publication Date: Jul. 2, 2015.*
Alic, A. et al., "Objective Review of De Novo Stand-Alone Error Correction Methods for NGS Data: Objective Review of De Novo Stand-Along NGS Correctors," Wiley Interdisciplinary Reviews: Computational Molecular Science, vol. 6, No. 2, Jan. 11, 2016, pp. 111-146.
Pereira, M. et al., "Statistical Learning Formulation of the DNA Base-Calling Problem and Its Solution in a Bayesian EM Framework," Discrete Application Mathematics, vol. 104, No. 1-3, Aug. 15, 2000, pp. 229-258.

* cited by examiner

*Primary Examiner* — Joseph Woitach
(74) *Attorney, Agent, or Firm* — Fenwick & West LLP

(57) ABSTRACT

A system and a method are described for applying a noise model for predicting the occurrence and a level of noise that is present in cfDNA read information. The significance model is trained for a plurality of stratifications of called variants using training data in the stratification. Stratifications may include a partition and a mutation type. The significance model predicts the likelihood of observing a read frequency for a called variant in view of two distributions of the significance model. The first distribution predicts a likelihood of noise occurrence in the sample. The second distribution predicts a likelihood of observing a magnitude of the read frequency for the called variant. The two distributions may further depend on a baseline noise level of blank samples. With these two distributions, the significance model, for a particular stratification, more accurately predicts the likelihood of a false positive for a called variant.

44 Claims, 25 Drawing Sheets

Parameter Table
<u>255</u>

|  | Partition 1 | Partition 2 | Partition N |
|---|---|---|---|
| Mutation Type 1 | $a^1_{1,1},...a^x_{1,1}$ $b^1_{1,1},...b^y_{1,1}$ | $a^1_{1,2},...a^x_{1,2}$ $b^1_{1,2},...b^y_{1,2}$ | $a^1_{1,n},...a^x_{1,n}$ $b^1_{1,n},...b^y_{1,n}$ |
| Mutation Type 2 | $a^1_{2,1},...a^x_{2,1}$ $b^1_{2,1},...b^y_{2,1}$ | $a^1_{2,2},...a^x_{2,2}$ $b^1_{2,2},...b^y_{2,2}$ | $a^1_{2,n},...a^x_{2,n}$ $b^1_{2,n},...b^y_{2,n}$ |

...

| Mutation Type M | $a^1_{m,1},...a^x_{m,1}$ $b^1_{m,1},...b^y_{m,1}$ | $a^1_{m,2},...a^x_{m,2}$ $b^1_{m,2},...b^y_{m,2}$ | $a^1_{m,n},...a^x_{m,n}$ $b^1_{m,n},...b^y_{m,n}$ |

```
┌─────────────────────────────────────────────────────┐
│ Receive a target read segment and a frequency of    │
│ the target read segment                             │
│ 405                                                 │
└─────────────────────────────────────────────────────┘
                          │
                          ▼
┌─────────────────────────────────────────────────────┐
│ Extract features from the target read segment       │
│ 410                                                 │
└─────────────────────────────────────────────────────┘
                          │
                          ▼
┌─────────────────────────────────────────────────────┐
│ Identify a stratification for the called variant    │
│ based on the extracted features                     │
│ 415                                                 │
└─────────────────────────────────────────────────────┘
                          │
                          ▼
┌─────────────────────────────────────────────────────┐
│ Retrieve parameters for a trained model, the        │
│ parameters generated for the identified             │
│ stratification of the called variant                │
│ 420                                                 │
└─────────────────────────────────────────────────────┘
                          │
                          ▼
┌─────────────────────────────────────────────────────┐
│ Apply a model to the frequency of the target        │
│ sequence read from the target read segment to       │
│ obtain multiple scores                              │
│ 425                                                 │
└─────────────────────────────────────────────────────┘
                          │
                          ▼
┌─────────────────────────────────────────────────────┐
│ Report the target read segment as a true variant    │
│ or a false positive variant based on a combination  │
│ of the multiple scores                              │
│ 430                                                 │
└─────────────────────────────────────────────────────┘
```

FIG. 4

| Partitions | Total | cfDNA Training (n=43) FP* (Yes) | cfDNA Testing (n=14) FP* (Yes) | gDNA (n=24) FP* (Yes) |
|---|---|---|---|---|
| 1: | 1,833,809 (95%) | 29184 (1.6%) | 7793 (0.4%) | 16989 (0.9%) |
| 2: | 80,117 (4%) | 20048 (25%) | 6146 (7.7%) | 6215 (7.8%) |
| 3: | 21,536 (1%) | 863 (4%) | 288 (1.3%) | 564 (2.6%) |

FIG. 6B

| Partition | Total | Transversions* | Transitions* | Oxidations* |
|---|---|---|---|---|
| 1 | 1,774,709 (95%) | 4,227 (0.2%) | 20,025 (1.1%) | 6,362 (0.4%) |
| 2 | 69801 (4%) | 177 (0.3%) | 16,424 (23.5%) | 790 (1.1%) |
| 3 | 19170 (1%) | 15 (0.1%) | 493 (2.6%) | 34 (0.2%) |

FIG. 7

$\frac{\text{(Detected Variants in cfDNA and tissue)}}{\text{(Detected Variants in tissue)}}$

| Cancer Type | $p < 10^{-4}$ | $p < 10^{-5}$ |
|---|---|---|
| Breast Cancer | 80.18% | 76.58% |
| Lung Cancer | 64.45% | 60.13% |
| Prostate Cancer | 65.93% | 64.44% |

FIG. 11A $\frac{\text{(Detected Variants in cfDNA and tissue)}}{\text{(Detected Variants in cfDNA)}}$

| Cancer Type | $p < 10^{-4}$ | $p < 10^{-5}$ |
|---|---|---|
| Breast Cancer | 43.63% | 52.47% |
| Lung Cancer | 46.63% | 54.52% |
| Prostate Cancer | 37.39% | 47.28% |

FIG. 11B

IDENTIFYING FALSE POSITIVE VARIANTS USING A SIGNIFICANCE MODEL

CROSS REFERENCE TO RELATED APPLICATIONS

This application claims the benefit of U.S. Provisional Application No. 62/553,593 filed Sep. 1, 2017, which is incorporated by reference in its entirety.

INTRODUCTION

Analysis of circulating cell free nucleotides, such as cell free DNA (cfDNA) or cell free RNA (cfRNA), using next generation sequencing (NGS) is recognized as a valuable tool for detection and diagnosis of cancer. Identifying rare variants indicative of cancer using NGS requires deep sequencing of circulating cfDNA from a patient test sample. However, deep sequencing has limitations. In particular, errors introduced during sample preparation and sequencing can make accurate identification of rare variants difficult.

A number of different methods have been developed for detecting variants, such as single nucleotide variants (SNVs), in sequencing data. Most conventional methods have been developed for calling variants from DNA sequencing data obtained from a tissue sample. These methods may not be suitable for calling variants from deep sequencing data obtained from a cell free nucleotide sample.

For non-invasive diagnostic and monitoring of cancer, targeted sequencing data of cell free nucleotides serve as an important bio-source. However, detection of variants in deep sequencing data sets poses distinct challenges: the number of sequenced fragments tend to be several order of magnitude larger (e.g., sequencing depth can be 2,000× or more)), debilitating most of the existing variant callers in compute-time and memory usage.

A second challenge is that DNA damage arises from the assay processing steps, thereby leading to both systematic and random errors in the targeted sequence data.

Additionally, detecting variants from cell free (e.g., cfRNA or cfDNA) samples poses a third challenge. Namely, the allele frequency (AF) of detectable variants are significantly lower in cell free samples in comparison to solid tissue samples. Increasing the sensitivity can enable the identification of a larger number of variants, but it also comes at the risk of additionally identifying numerous false positives.

SUMMARY

Disclosed herein are methods and systems for training and applying a background noise model that predicts the occurrence and a level of noise that is present in sequencing read information. In particular, disclosed herein are models to assess the significance level of evidence and identify and eliminate called variant read segments that are, in fact, likely to be false positives based on the presence of noise in the sample that the variant was called from. Therefore, an overall pipeline that incorporates the significance model can identify true variants at higher sensitivities and specificities.

Generally, the significance model is trained for a particular stratification of called variants using training data that are also categorized in the stratification. As an example a stratification includes a combination of a partition and a mutation type for a called variant. As the level of noise in a called variant can differ based on the stratification, a significance model is trained to account for the varying level of noise in each stratification. Altogether, the significance model is used to predict a likelihood of observing a read frequency for a called variant given the stratification of the called variant.

Specifically, the significance model predicts the likelihood of observing a read frequency for a called variant in view of two distributions of the significance model. The first distribution predicts the likelihood of the occurrence of noise in the sample in view of the training data whereas the second distribution predicts the likelihood of observing a magnitude of the read frequency for the called variant. Each of the two distributions is further generated by considering a baseline noise level, referred to as a limit of blank. The limit of blank can be experimentally determined from blank samples and then used as a basis for training the different distributions of a significance model. Altogether, through these two distributions, the significance model trained for a particular stratification can more accurately predict the likelihood of a false positive for a called variant categorized in that particular stratification.

In one embodiment, a method with steps of: receiving a target read segment and a read frequency of the target read segment; identifying a stratification for the target read segment; accessing a set of parameters specific for the stratification of the received target read segment; applying a significance model comprising two or more distributions to the read frequency of the target read segment to obtain two or more scores, at least one distribution defined by the accessed set of parameters; generating significance information by combining the two or more scores; and reporting the target read segment as one of a true or false positive based on the generated significance information.

In one embodiment, a system comprising a processor and a computer-readable storage medium with instructions that, when executed by the processor, cause the processor to accomplish the steps of: receiving a target read segment and a read frequency of the target read segment; identifying a stratification for the target read segment; accessing a set of parameters specific for the stratification of the received target read segment; applying a significance model comprising two or more distributions to the read frequency of the target read segment to obtain two or more scores, at least one distribution defined by the accessed set of parameters; generating significance information by combining the two or more scores; and reporting the target read segment as one of a true or false positive based on the generated significance information.

In one embodiment of the method or the system, the target read segment is an obtained sequence read, an aligned sequence read, a collapsed read, a stitched read, an individual nucleotide corresponding to an identified variant, or any combination thereof.

In one embodiment of the method or the system, the step of reporting the target read segment as one of the true or false positive comprises reporting the target read segment as a true or false positive called variant.

In one embodiment of the method or the system, the step of reporting the target read segment as one of the true or false positive comprises reporting the target read segment as a true or false positive obtained sequence read.

In one embodiment of the method or the system, the step of reporting the target read segment as one of the true or false positive comprises reporting the target read segment as a true or false positive aligned sequence read.

In one embodiment of the method or the system, the step of reporting the target read segment as one of the true or false positive comprises reporting the target read segment as a true or false positive collapsed sequence read.

In one embodiment of the method or the system, the step of reporting the target read segment as one of the true or false positive comprises reporting the target read segment as a true or false positive stitched sequence read.

In one embodiment of the method or the system, the target read segment is sequenced from a cell free nucleotide sample obtained from an individual.

In one embodiment of the method or the system, the method or the system further comprises steps of extracting features from the target read segment, wherein the identified stratification for the target read segment is based on the extracted features.

In one embodiment of the method or the system, the extracted features are one or more of a depth of coverage, trinucleotide background, percentage of guanine-cytosine nitrogenous bases, mappability, distance of the target read segment from a repeating sequence, type of DNA strand, past evidence of false positives associated with a location of a genome that the target read segment is derived from, and mutation type.

In one embodiment of the method or the system, the identified stratification for the target read segment comprises a combination of a partition and a mutation type.

In one embodiment of the method or the system, the partition is based on a trinucleotide context of a nucleotide base in the target read segment.

In one embodiment of the method or the system, the trinucleotide context is one of: (1) having either a CGx or xCG context and (2) not having either a CGx or xCG context.

In one embodiment of the method or the system, the partition is based on a range of mean coverage of a nucleotide base in the target read segment.

In one embodiment of the method or the system, the range of mean coverage is one of less than 2000 reads, between 2000 and 6000 reads, and greater than 6000 reads.

In one embodiment of the method or the system, the mutation type is one of a nucleotide transversion, transition, oxidation, and cytosine deamination.

In one embodiment of the method or the system, a first distribution of the stratification significance model is a binomial distribution and wherein a second distribution of the stratification significance model is a Weibull distribution.

In one embodiment of the method or the system, a first score represents a likelihood of observing an occurrence of noise in the target read segment in view of a first of the two or more distributions.

In one embodiment of the method or the system, a second score represents a likelihood of observing a magnitude of the read frequency of the target read segment in view of a second of the two or more distributions.

In one embodiment of the method or the system, the significance model is trained by: receiving training examples that each comprise features of a training read segment and a read frequency of the training read segment; categorizing each training example in a stratification based on the features of the training read segment of the training example; receiving a baseline noise value derived from measurements obtained from blank samples; generating the two or more distributions of the stratification significance model specific for a stratification using the read frequencies of training examples categorized in the stratification and the baseline noise value, each of the two or more distributions defined by a set of model parameters; and for each of the two or more distributions, storing the set of model parameters defining the distribution.

In one embodiment of the method or the system, the step of generating the two or more distributions of the significance model specific for a stratification using the read frequencies of training examples categorized in the stratification and the baseline noise value comprises: fitting a first regression across a range of read frequencies that includes the baseline noise value to generate a first distribution; and fitting a second regression across a range of read frequencies greater than the baseline noise value to generate a second distribution.

In one embodiment of the method or the system, the baseline noise value is determined by: receiving a plurality of read frequencies corresponding to read segments obtained from blank samples; and generating the baseline noise value based on a mean and standard deviation of the plurality of read frequencies from blank samples.

BRIEF DESCRIPTION OF THE DRAWINGS

FIG. 2B depicts an example parameter table including parameters for a trained significance model, in accordance with an embodiment.

FIG. 4 depicts a flow process of applying a trained significance model, in accordance with an embodiment.

FIG. 6B depicts an example of counts of chromosome/positions of identified false positives in different partitions for the cell free DNA training dataset, the cell free DNA testing dataset, and the genomic DNA dataset, in accordance with an embodiment.

FIG. 7 depicts an example of quantified totals of mutation types in each of three partitions for the cell free DNA datasets, in accordance with an embodiment.

FIG. 11A depicts concordant variants detected by both the full process and a conventional method in cell free DNA and solid tumor tissue, respectively, as a fraction of the true variants from solid tumor solely called by the conventional method at two different significance levels, in accordance with an embodiment.

FIG. 11B depicts concordant variants detected by both the full process and a conventional method in cell free DNA and solid tumor tissue, respectively, as a fraction of the true variants from cfDNA solely called by the full process at two different significance levels, in accordance with an embodiment.

DETAILED DESCRIPTION

Definitions

Figure 1A:
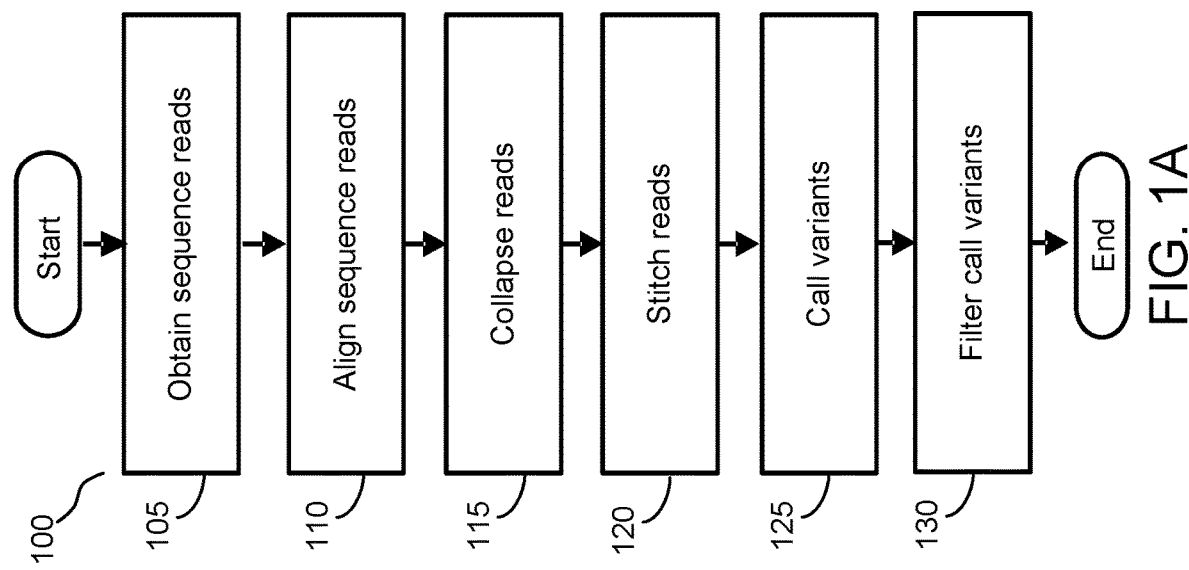
FIG. 1A depicts a partial workflow of identifying and filtering variants, in accordance with an embodiment.

The term "individual" refers to a human individual. The term "healthy individual" refers to an individual presumed to not have a cancer or disease. The term "case" refers to an individual who is known to have, or potentially has, a cancer or disease.

The term "cell free nucleic acid" or "cfNA" refers to nucleic acid fragments that circulate in an individual's body (e.g., blood) and originate from one or more healthy cells and/or from one or more cancer cells. The term "cell free DNA," or "cfDNA" refers to deoxyribonucleic acid fragments that circulate in an individual's body (e.g., blood). Additionally cfNAs or cfDNA in an individual's body may come from other sources such as viruses, fetuses, etc.

The term "genomic nucleic acid," "genomic DNA," or "gDNA" refers to nucleic acid molecules or deoxyribonucleic acid molecules obtained from one or more cells. In various embodiments, gDNA can be extracted from healthy cells (e.g., non-tumor cells) or from tumor cells (e.g., a biopsy sample). In some embodiments, gDNA can be extracted from a cell derived from a blood cell lineage, such as a white blood cell.

The term "circulating tumor DNA" or "ctDNA" refers to nucleic acid fragments that originate from tumor cells or other types of cancer cells, and which may be released into a bodily fluid of an individual (e.g., blood, sweat, urine, or saliva) as result of biological processes such as apoptosis or necrosis of dying cells or actively released by viable tumor cells.

The term "sequence read" refers to a nucleotide sequence obtained from a nucleic acid molecule from a test sample from an individual (e.g., a human individual). Sequence reads can be obtained through various methods known in the art.

The term "read segment" refers to any nucleotide sequence derived from the initial sequence read from a nucleic acid molecule (e.g., a cfNA molecule) from a test sample from an individual. For example, a read segment can refer to a sequence read, an aligned sequence read, a collapsed sequence read, a stitched sequence read, or any combination thereof. Furthermore, a read segment can refer to an individual nucleotide base, such as a single nucleotide variant.

The term "sequencing depth" or "depth" refers to a total number of sequence reads or read segments at a given genomic location or loci from a test sample from an individual.

The term "mutation type" refers to any one of a nucleotide base substitution, insertion, or deletion. Examples of nucleotide base substitution may be one of a transversion (e.g., purine to pyrimidine or vice versa mutation), a transition (e.g., a purine to purine or pyrimidine to pyrimidine mutation such as a cytosine deamination related mutation), or an oxidation (such as guanine oxidation).

The term "alternative allele" or "ALT" refers to an allele having one or more mutations relative to a reference allele, e.g., corresponding to a known gene.

The term "allele frequency" or "AF" refers to the number of times a called variant was read from a test sample. The allele frequency for a called variant may expressed as a percentage of all reads from a test sample (e.g., AF of a variant=0.5% of all reads).

The term "candidate variant," "called variant," or "putative variant" refers to one or more detected nucleotide variants of a nucleotide sequence, for example, at a position in the genome that is determined to be mutated. Generally, a nucleotide base is deemed a called variant based on the presence of an alternative allele on sequence reads obtained from a test sample, where the sequence reads each cross over the position in the genome. The source of a candidate variant may initially be unknown or uncertain. During processing, candidate variants may be associated with an expected source such as gDNA (e.g., blood-derived) or cells impacted by cancer (e.g., tumor-derived). Additionally, candidate variants may be called as true positives.

The term "single nucleotide variant" or "SNV" refers to a substitution of one nucleotide to a different nucleotide at a position (e.g., site) of a nucleotide sequence, e.g., a sequence read from an individual. A substitution from a first nucleobase X to a second nucleobase Y may be denoted as "X>Y." For example, a cytosine to thymine SNV may be denoted as "C>T."

The term "variant" refers to a nucleotide base substation or mutation at a position in the genome relative to a reference genome (e.g., a healthy genome). The term "true variant" or "true positive" refers to a nucleotide base substitution or mutation that indicates real biology, for example, presence of a potential cancer, disease, or germline mutation in an individual. True variants are variants that do not occur in healthy individuals. Such a "true variant" may be a variant that can lead to the development and/or progression of cancer in an individual.

The term "false positive" refers to a nucleotide base substation or mutation incorrectly determined to be a true positive.

Identifying Variants Annotated with Support and Significance Information

Figure 1B:
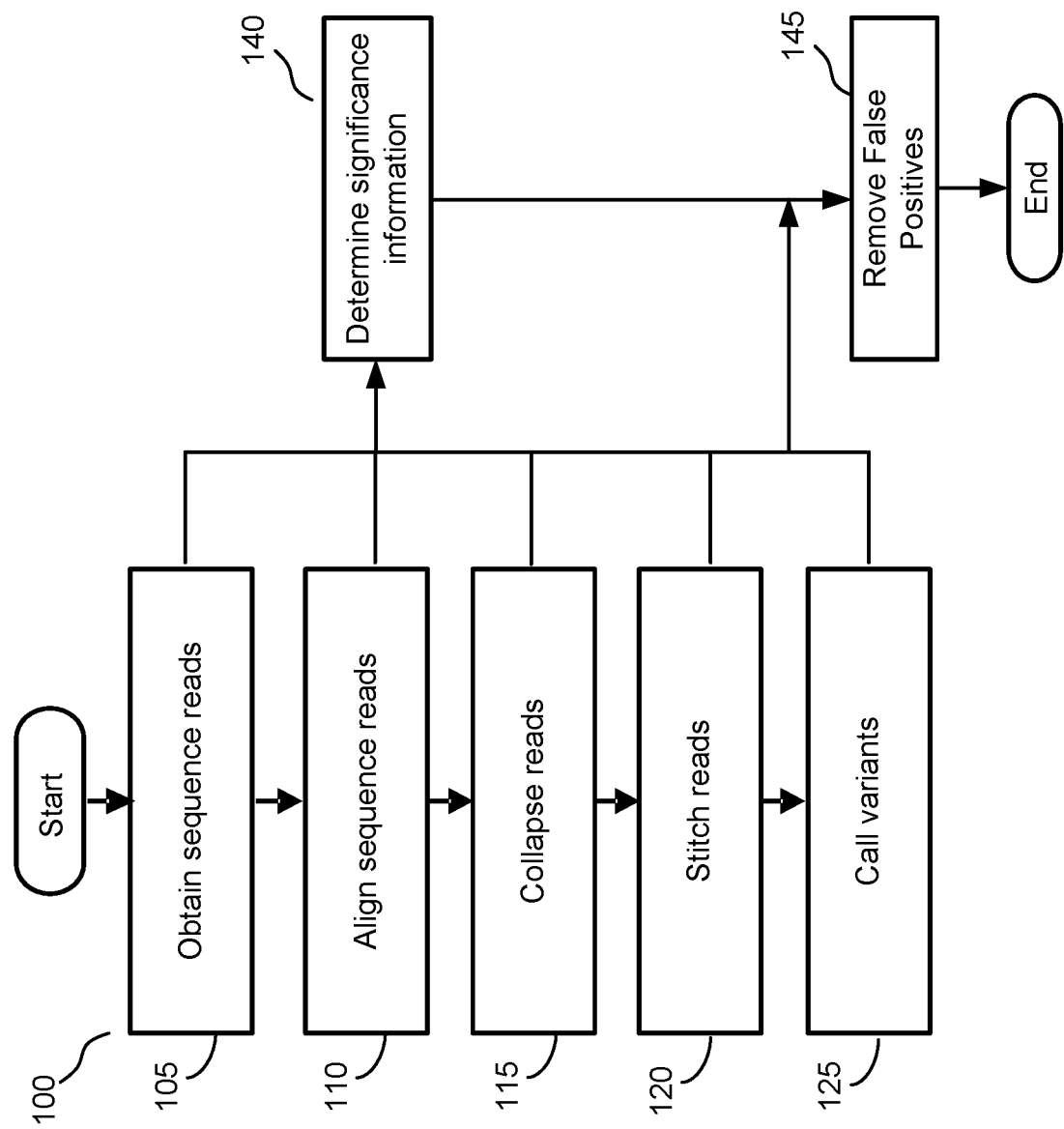
FIG. 1B depicts a full workflow of identifying and filtering variants with the incorporation of a significance model, in accordance with a first embodiment.
Figure 1C:
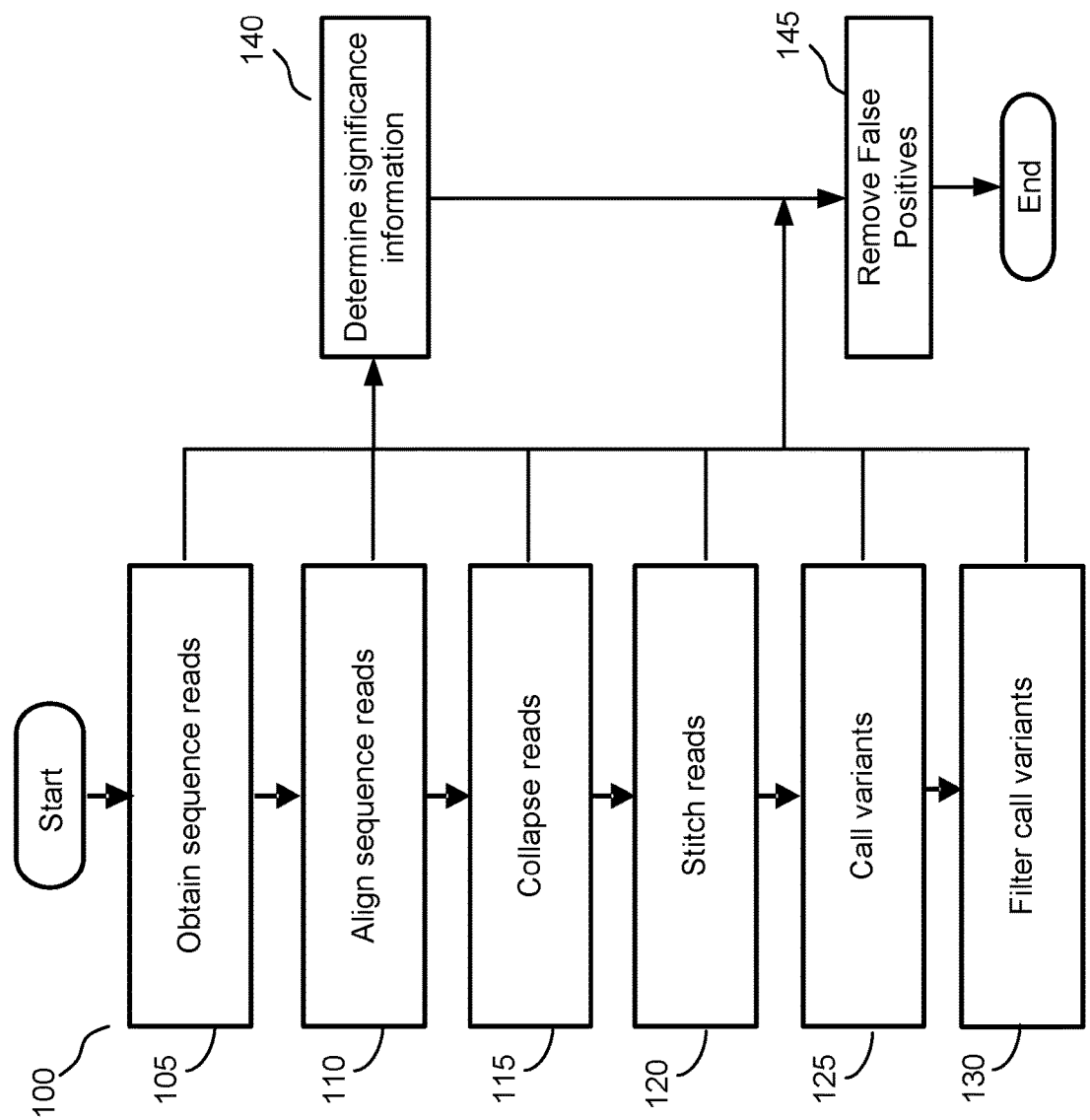
FIG. 1C depicts a full workflow of identifying and filtering variants with the incorporation of a significance model, in accordance with a second embodiment.

FIG. 1A depicts a partial workflow of identifying and filtering variants in a sample, e.g., a cell free nucleic acid (DNA or RNA) sample, in accordance with an embodiment. Specifically, the "partial workflow process", as shown in FIG. 1A, is a process that does not include the application of a significance model. Further reference will be made to FIG. 1B and FIG. 1C, each of which depicts a "full workflow process" of identifying and filtering variants in a sample with the incorporation of a significance model, in accordance with an embodiment. Specifically, the full workflow process shown in each of FIGS. 1B and 1C includes the application of a significance model. FIG. 1B depicts the incorporation of the significance model at step 140 which replace the step 130 of filtering called variants (as shown in FIG. 1A). Alternatively, FIG. 1C depicts the incorporation of the significance model at step 140 which is in addition to the step 130 of filtering called variants.

Method 100 may include, but is not limited to, the following steps.

At step 105, sequence reads are obtained.

Figure 12:
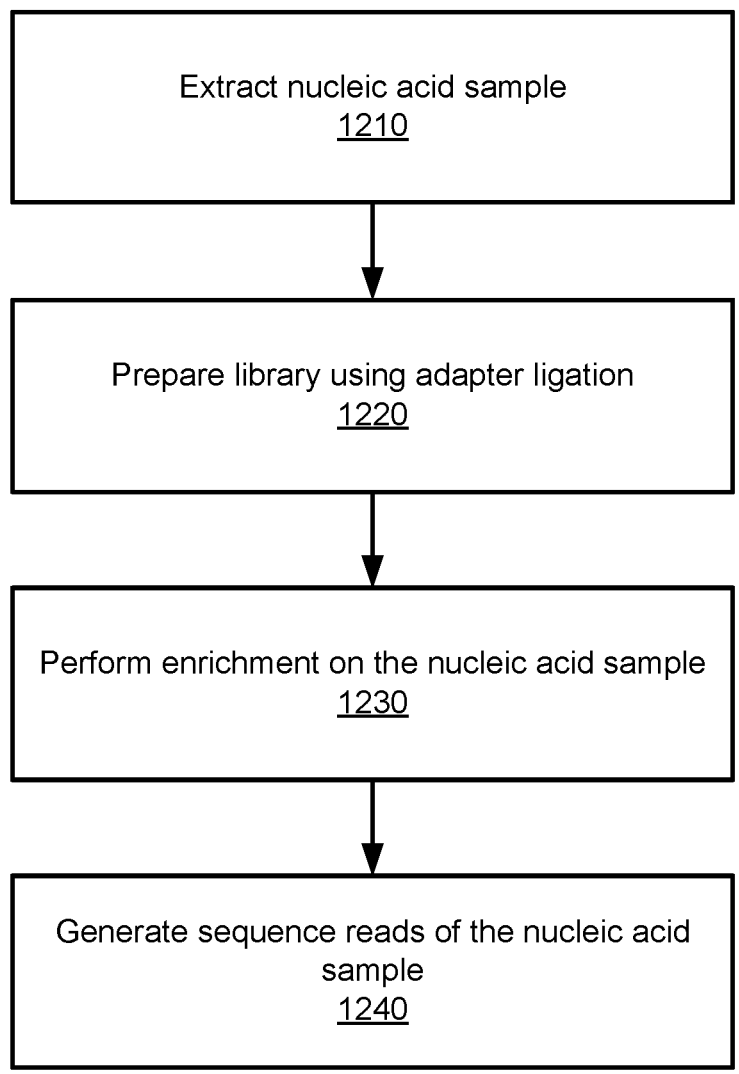
FIG. 12 depicts a flow process of obtaining sequence reads, in accordance with an embodiment, in accordance with an embodiment.

Further reference is made to FIG. 12, which depicts a flow process 1200 of step 105 of obtaining sequence reads, in accordance with an embodiment. At step 1210, a nucleic acid sample (DNA or RNA) is extracted from an individual, e.g., a patient. In one embodiment, the test sample may be cfDNA extracted from plasma or genomic DNA (gDNA) extracted from buffy coat or cell lines. The test sample may be a sample selected from the group consisting of blood, plasma, serum, urine, fecal, and saliva samples. Alternatively, the test sample may comprise a sample selected from the group consisting of whole blood, a blood fraction, a tissue biopsy, pleural fluid, pericardial fluid, cerebral spinal fluid, and peritoneal fluid. In accordance with some embodiments, the test sample comprises cell free nucleic acids (e.g., cfDNA or cfRNA), wherein the cell free nucleic acids in the test sample originate from one or more healthy cells and/or from one or more cancer cells.

In step 1220, a sequencing library is prepared. During library preparation, unique molecular identifiers (UMI) are added to the nucleic acid molecules (e.g., DNA or RNA) through adapter ligation. The UMIs are short nucleic acid sequences (e.g., 4-10 base pairs) that are added to ends of DNA fragments during adapter ligation. In some embodiments, UMIs are degenerate base pairs that serve as a unique tag that can be used to identify sequence reads obtained from a specific DNA fragment. During PCR amplification following adapter ligation, the UMIs are replicated along with the attached DNA fragment, which provides a way to identify sequence reads that came from the same original DNA fragment in downstream analysis.

In step 1230, targeted DNA sequences are enriched from the library. In one embodiment, during targeted enrichment, hybridization probes (also referred to herein as "probes") are used to target, and pull down, nucleic acid fragments informative for the presence or absence of cancer (or disease), cancer status, or a cancer classification (e.g., cancer type or tissue of origin). For a given workflow, the probes may be designed to anneal (or hybridize) to a target (complementary) strand of DNA or RNA. The probes may range in length from 10s, 100s, or 1000s of base pairs. In one embodiment, the probes are designed based on a gene panel to analyze particular mutations or target regions of the genome (e.g., of the human or another organism) that are suspected to correspond to certain cancers or other types of diseases. Moreover, the probes may cover overlapping portions of a target region. By using a targeted gene panel rather than sequencing the whole genome ("whole genome sequencing"), or all expressed genes of a genome ("whole exome sequencing"), the method 1200 may increase sequencing depth of the target regions, where depth refers to the count of the number of times a given probe has matched a given copy of the target sequence within the sample. Increasing sequencing depth allows for detection of rare sequence variants in a sample and/or increases the throughput of the sequencing process. After a hybridization step, the hybridized nucleic acid fragments are captured and may also be amplified using PCR.

In step 1240, sequence reads are generated from the enriched DNA sequences. Sequence reads may be acquired from the nucleic acid molecules in a sample by known means in the art. For example, the method 100 may include next generation sequencing (NGS) techniques including synthesis technology (Illumina), pyrosequencing (454 Life Sciences), ion semiconductor technology (Ion Torrent sequencing), single-molecule real-time sequencing (Pacific Biosciences), sequencing by ligation (SOLiD sequencing), nanopore sequencing (Oxford Nanopore Technologies), or paired-end sequencing. In some embodiments, massively parallel sequencing is performed using sequencing-by-synthesis with reversible dye terminators.

Returning to FIG. 1A or 1B, at step 110, sequence reads are aligned to a reference genome. In general, any known method in the art can be used for aligning the sequence reads to a reference genome. For example, the nucleotide bases of a sequence read are aligned with nucleotide bases in the reference genome to determine alignment position information for the sequence read. Alignment position information can include a beginning position and an end position of a region in the reference genome that corresponds to the beginning nucleotide base and end nucleotide base of the sequence read. Alignment position information may also include sequence read length, which can be determined from the beginning position and end position. In various embodiments, a region in the reference genome corresponds to a gene. In some embodiments, a region in the reference genome refers to a segment of a gene.

In various embodiments, a sequence read is comprised of a read pair denoted as $R_1$ and $R_2$. For example, the first read $R_1$ may be sequenced from a first end of a nucleic acid fragment whereas the second read $R_2$ may be sequenced from the second end of the nucleic acid fragment (e.g., through paired-end sequencing). Therefore, nucleotide base pairs of the first read $R_1$ and second read $R_2$ may each be aligned consistently (e.g., in opposite orientations or a reverse complement) with nucleotide bases of the reference genome. Alignment position information derived from the read pair $R_1$ and $R_2$ may include a beginning position in the reference genome that corresponds to an end of a first read (e.g., $R_1$) and an end position in the reference genome that corresponds to an end of a second read (e.g., $R_2$). In other words, the beginning position and end position in the reference genome represent the likely location within the reference genome that the nucleic acid fragment corresponds to. In various embodiments, a BAM file of aligned sequencing reads for regions of the genome is obtained and utilized for analysis in subsequent steps of the methods disclosed herein.

At step 115, read segments, such as the aligned sequence reads, are collapsed. In one embodiment, collapsing sequence reads includes using the unique molecular identifiers (UMIs), and optionally the alignment positions or length, to collapse multiple sequence reads into a consensus sequence for determining the most likely sequence of a nucleic acid fragment or a portion thereof. The unique molecule identifier (UMI) can be from about 4 to 20 nucleic acids in length. In accordance with this embodiment, during sequencing library preparation, UMIs can be added to the nucleic acid molecules in the sample (e.g., through adaptor ligation). After sequencing, the UMIs can then be used to collapse sequencing data or sequence reads having the same UMI, and thus, sequence reads originating from the same nucleic acid molecule in the test sample. In some embodiments, sequence reads that have the same alignment position information (e.g., beginning and end positions) and share the same UMIs are collapsed and a consensus read (e.g., consensus sequence) is generated to represent the fragment.

At step 120, the consensus reads are optionally stitched based on their alignment position information. Generally, the alignment position information of a first read is compared to the alignment position information of a second read to determine whether nucleotide base pairs of the first and second read overlap in the reference genome. In various embodiments, if the overlap (e.g., number of overlapping nucleotide bases) between the first and second reads are above a threshold length (e.g., threshold number of nucleotide bases), then the first and second reads are stitched together to generate a stitched read. In some embodiments, a first and second read are stitched if the overlap is above a threshold length and if the overlap is a not a sliding overlap. For example a sliding overlap is one of a homopolymer run (e.g., a single repeating nucleotide base), a dinucleotide run (e.g., repeating two nucleotide base sequence), or a trinucleotide run (e.g., three nucleotide base sequence), where the homopolymer run, dinucleotide run, or trinucleotide run is longer than a threshold length.

At step 125, the consensus sequence or stitched reads are used to call variants. In various embodiments, the variants are called using a directed graph, such as a De Bruijn graph. A directed graph may be built for a region (e.g., a gene). The nodes of the directed graph represent overlapping kmers (e.g., sequence of k nucleotide bases) in the region and the edges connecting the nodes represent the sequence of a first kmer and second kmer (e.g., first kmer of a first node connected through the edge to a second node representing the second kmer).

In these embodiments, the consensus sequence or stitched reads are aligned to the directed graph and the directed graph is further processed (e.g., trimmed or pruned) based on the number of stitched reads that are aligned along the nodes of the directed graph. For example, for each stitched read, the kmers of the stitched read is aligned with the kmers represented by a node in the directed graph. The number of successful aligned kmers from stitched reads to a kmer represented by a node in the directed graph establishes the importance of a particular kmer and/or sequence of kmers in the directed graph. In various embodiments, the directed graph is processed to remove nodes and edges of less importance while maintaining nodes and edges of higher importance.

To call variants, the processed directed graph is compared to a reference sequence (e.g., a reference sequence of a region of a genome). In various embodiments, edges of the processed directed graph are aligned to the reference sequence. The edges and nucleotide sequences to the left and right of the edges are compared to the reference sequence. Generally, the genomic positions of mismatched edges and mismatched nucleotide bases to the left and right of edges are recorded as the locations of called variants. Additionally, variant calling can be performed based on the sequencing depth of a target region. In particular, a higher confidence can be assigned to identified variants in target regions that have greater sequencing depth, for example, because a greater number of sequence reads can be used to resolve (e.g., using redundancies) mismatches or other base pair variations between sequences.

Referring specifically to step 130 shown in FIG. 1A and FIG. 1C, step 130 represents one embodiment of the variant filtering logic in the pipeline. The called variants are filtered to output a set of high-confidence variants. Generally, each called variant is analyzed and assigned a support score that represents a level of confidence that the called variant is a true variant. A called variant associated with a support score that is above of a threshold score is kept as a high-confidence variant whereas called variants associated with a support score below a threshold score are filtered out. In various embodiments, the support score generated for each called variant is dependent on prior knowledge about a called variant and/or systematic errors observed in a set of healthy samples for that chromosome/position. For example, if a particular called variant occurs systematically in healthy samples, then the same called variant may be assigned a low support score to indicate the likelihood that the called variant is due to a systematic error. In some embodiments, a support score generated for a called variant is dependent on the context in which the variant is called. For example, if the called variant is near or within a homopolymer, dinucleotide, or trinucleotide run, a lower support score is assigned to the called variant. In some scenarios, the support score may be determined based on sequencing depth of a target region including the variant, and the threshold value may be based on an average sequencing depth of the target region in a set of previously sequenced samples (e.g., reference data).

Referring now to step 140 shown in FIG. 1B and FIG. 1C, significance information is determined for any one of the aforementioned processes (e.g., steps 105, 110, 115, 120, 125, or 130). In various embodiments, the significance information corresponding to each step can be an indication as to whether noise arising from the performed step and any or all preceding steps has likely confounded the result of that step. Such significance information can be represented or stored as annotations or features associated with other data generated as a part of one or more steps of the process 100. For example, significance information corresponding to step 105 of obtaining sequence reads may be an indication of noise arising from the process of obtaining a sequence read. Therefore, the significance information can represent a level of confidence that the nucleotide bases of an obtained sequence read from a sample accurately represents the nucleotide bases of the nucleotide base sequence of a genome of a patient that the sample was obtained from. The significance information determined for step 110 of aligning sequence reads may be an indication of noise of each aligned sequence read due to the process of aligning the sequence read. The significance information corresponding to step 115 of collapsing sequence reads may be an indication of noise arising from the process of collapsing the reads to generate consensus sequences. The significance information corresponding to step 120 of stitching sequence reads may be an indication of noise arising from the process of stitching the sequence reads. The significance information corresponding to step 125 of calling variants may be an indication of noise arising from the process of calling the variants. Here, the noise in each high-confidence variant may arise from each of steps 105, 110, 115, 120, 125, or 130. Discussion of determining significance information is described in further detail below.

At step 145, false positives are removed based on the significance information determined at step 140. For example, if the determined significance information corresponds to step 105 of obtaining sequence reads, then false positive obtained sequence reads are removed at step 145. As another example, if the determined significance information corresponds to step 110 of aligning sequence reads, then false positive aligned sequence reads are removed at step 145. As another example, if the determined significance information corresponds to step 115 of collapsing sequence reads, then false positive collapsed sequence reads are removed at step 145. As another example, if the determined significance information corresponds to step 120 of stitching sequence reads, then false positive stitched sequence reads are removed at step 145. As another example, if the determined significance information corresponds to step 125 of calling variants, then false positive called variants are removed at step 145. As another example, if the determined significance information corresponds to step 130 of filtering variants to obtain high-confidence variants, then false positive high-confidence variants are removed at step 145.

Applying a Significance Model to Determine a Significance Score

Figure 2A:
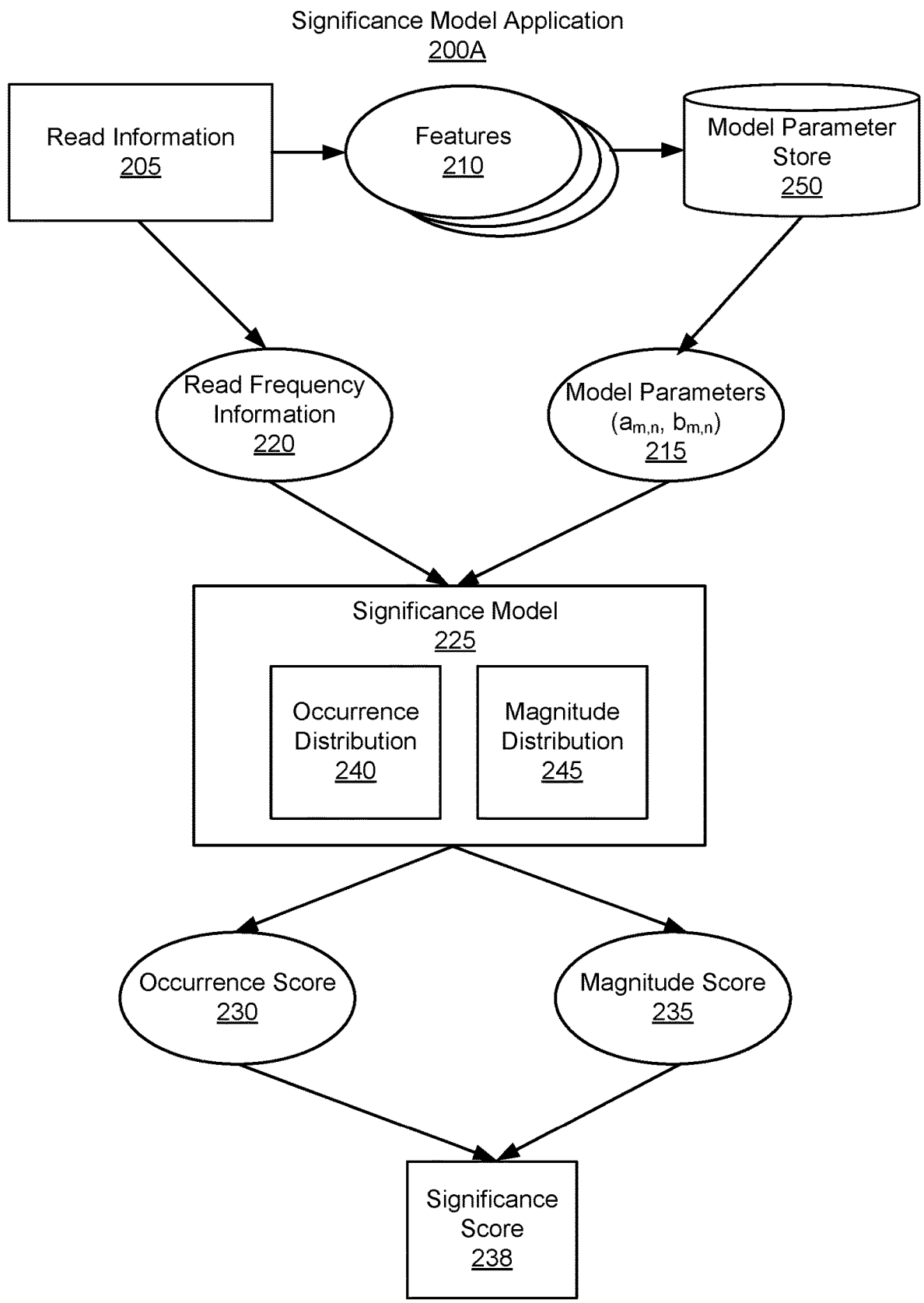
FIG. 2A depicts the application of a trained significance model for determining a significance score, in accordance with an embodiment.

FIG. 2A depicts the application of a trained significance model 225 for determining significance score 238, in accordance with an embodiment. Generally, read information 205 corresponds to a read segment from any one of steps 105, 110, 115, 120, 125, or 130, as described above. The read information 205 is analyzed by applying a trained significance model 225 to determine significance score 238 corresponding to one or more of the steps. The subsequent description refers specifically to determining a significance score for a called variant (e.g., called variants from step 125); however, the same description can also apply to any of the aforementioned steps.

Generally, the read information 205 includes read frequency information 220, such as the number of times a particular read segment was read. If the read information 205 is a called variant, the corresponding read frequency information can include an allele frequency read, which refers to the number of times the called variant was read from the sample. In some embodiments, the allele frequency for a called variant is expressed as a percentage of all reads from a sample (e.g., AF of a variant=0.5% of all reads). The read frequency information 220 is provided to the significance model 225 as input.

Selecting a Significance Model

The read information 205 is processed to extract features 210. Extracted features 210 can include genomic features related to the called variant. For example, genomic features can include depth of coverage of the called variant (e.g., the number of read segments that include a called variant across all read segments), trinucleotide context of the called variant, percentage of guanine-cytosine nitrogenous bases (GC %) of a read segment including the called variant, mappability (e.g., measure of uniqueness of a read) of a read segment including the called variant, distance of the called variant from a repeating sequence (e.g., one of a homopolymer, dinucleotide repeat, or trinucleotide repeating sequence), type of strand (e.g., sense or anti-sense DNA strand), and past evidence associated with a location of the reference genome that the called variant is derived from (e.g., location is associated with past recurrent false positives, known decoy regions, segmental duplications, copy number variations, or insertion/deletion of bases). Additionally, the extracted features 210 can include a mutation type for the called variant.

The features 210 extracted from the read information 205 are used to guide the selection of the appropriately trained significance model 225. An appropriately trained significance model 225 selected for the extracted features 210 refers to a significance model 225 trained specifically for a stratification that matches the stratification of the read information 205. Generally, a stratification refers to a categorization of read information 205. The read information 205 is placed in a stratification according to the features 210 extracted from the read information 205. Specifically in certain embodiments, a stratification of read information 205 refers to a partition type and a mutation type of the read information 205, where the partition type and mutation type are defined by the features 210 of the read information 205. Altogether, when read information 205 of a particular stratification (e.g., as defined by its extracted features 210) is received, the significance model 225 trained for the matching stratification is selected.

The extracted features 210 of the read information 205 are used to retrieve the appropriate model parameters 215 from the model parameter store 250. Generally, the model parameters 215 are numerical values that define the different distributions of the trained significance model 225 and are derived from the training data. As shown in FIG. 2A, the significance model 225 may include an occurrence distribution 240 and a magnitude distribution 245, both of which are described in further detail below. Therefore, the retrieved model parameters 215 may be constant values for each of the occurrence distribution 240 and the magnitude distribution 245. Generally, a first set of model parameters 215 is retrieved for the occurrence distribution 240 and a second set of model parameters 215 are retrieved for the magnitude distribution 245. Additionally, each of the one or more sets of parameters are generated and accessed separately for each stratification, such that the model parameters specific to each stratification are trained and applied to data within/applicable to that stratification. For example, for each of an Nth partition and Mth mutation type, one or more sets of model parameters 215 are retrieved.

Reference is now made to FIG. 2B, which depicts an example parameter table 255 stored in the model parameter store 250 that includes parameters for a trained significance model, in accordance with an embodiment. Specifically, FIG. 2B depicts two sets of model parameters 215 (e.g., parameter set a and parameter set b) for various stratifications (e.g., a partition and a mutation type). In other embodiments, more or fewer sets of parameters may be stored in the parameter table. Referring to Partition N and Mutation Type M in the parameter table 255 (e.g., bottom right entry), a first set of parameters includes $\{a_{m,n}^{1}, \ldots a_{m,n}^{x}\}$ and the second set of parameters includes $\{b_{m,n}^{1}, \ldots b_{m,n}^{y}\}$, where m refers to the Mth mutation type, n refers to the Nth partition, and x and y refer to the xth and yth parameter in each respective set of parameters. In some embodiments, x and/or y equals 1, indicating that a set of parameters has one parameter.

Each of the N different partitions can be determined based on one or more genomic characteristics from where the called variant derived from. For example, a partition can be based on the trinucleotide context. A trinucleotide context refers to any three sequential nucleotide base pairs. For example, a nucleotide sequence of cytosine-guanine-cytosine (CGC) is the trinucleotide context within which a single nucleotide substitution, such as: G→A resulting in CAC, G→C resulting in CCC, or G→T resulting in CTC, may be called. As another example, the partitions may be determined based on a mean depth of coverage of the nucleotide base(s) corresponding to the called variant.

As another example, there may be three partitions and they are as follows:

Partition 1: The trinucleotide context of the called variant is not CGx or xCG, where x is any nucleotide base.

Partition 2: The trinucleotide context of the called variant is CGx or xCG, additionally, the mean coverage is between 2000 and 6000.

Partition 3: The trinucleotide context of the called variant is CGx or xCG, additionally, the mean coverage is either less than 2000 or greater than 6000.

In other embodiments, different defining characteristics of each partition may be used to determine additional or fewer partitions.

Referring now to the M different mutation types, as described above, each mutation type may be one of a nucleotide base substitution, insertion, or deletion, and can be extracted as a feature 210 from the read information 205.

Returning to FIG. 2A, the extracted features 210 of the read information 205 are used to identify the appropriate entry of the parameter table 255 regarding which set of model parameters 215 are to be retrieved. For example, the extracted features 210 are used to identify the corresponding partition (e.g., the appropriate column of the parameter table 255 shown in FIG. 2B) and also the appropriate mutation type of the called variant (e.g., the appropriate row of the parameter table 255 shown in FIG. 2B). Therefore, the one or more sets of model parameters 215 stored in the entry of the parameter table 255 corresponding to the mutation type and partition of the called variant are retrieved and provided to the trained significance model 225.

Generating a Significance Score Using Distributions of the Significance Model

Generally, the significance model 225 outputs an occurrence score 230 and a magnitude score 235 based on the inputted read frequency information 220. Specifically, the trained significance model 225 receives the model parameters 215 that define the distributions, such as the occurrence distribution 240 and the magnitude distribution 245. The distributions 240 and 245 are each applied to the read frequency information 220 received by the significance model 225. Each distribution 240 and 245 generates a numerical value, such as an occurrence score 230 and a magnitude score 235. The occurrence score 230 and magnitude score 235 are combined to generate the significance score 238. Altogether, if the significance score 238 indicates a high likelihood of noise that impacted the observed read frequency information 220 of a called variant, the significance score 238 can be used to identify and eliminate false positive called variants.

Referring more specifically now to the individual distributions 240 and 245 of the significance model 225, each distribution 240 and 245 predicts a likelihood of observing the read frequency information 220 that was, in fact, observed. As an example, the occurrence distribution 240 predicts the likelihood of an occurrence of noise whereas the magnitude distribution 245 predicts the likelihood of observing a magnitude of the read frequency information 220. Each of the occurrence distribution 240 and magnitude distribution 245 may be one of a binomial, negative binomial, Weibull, Poisson, Gaussian, log normal, exponential, geometric, gamma, beta, chi-squared distribution, or another similar type of distribution. In various embodiments, the occurrence distribution 240 and magnitude distribution 245 may be a distribution derived from empirical data (e.g., a non-parametric empirical distribution).

For each of the occurrence distribution 240 and magnitude distribution 245, the significance model 225 applies a retrieved set of model parameters 215 that define each distribution 240 and 245. As an example, assuming that a distribution 240 or 245 is a Weibull distribution, then the cumulative distribution function of the Weibull distribution can be expressed as:

$$f(x; \lambda, k) = 1 - e^{-(\frac{x}{\lambda})^k} \quad (1)$$

where x is the Weibull random variable, $\lambda$ is a scale parameter, and k is a shape parameter. Here, $\lambda$ and k are the model parameters 215 retrieved from the parameter table 255, and therefore define the Weibull distribution for a particular partition and/or mutation type. As another example, assuming that a distribution 240 or 245 is a binomial distribution, then the cumulative distribution function of the binomial distribution can be expressed as:

$$f(x; n, p) = \sum_{i=0}^{x} \binom{n}{i} p^i (1-p)^{n-i} \quad (2)$$

Here, n and p are the model parameters 215 retrieved from the parameter table 255.

Given the model parameters 215 of each distribution 240 and 245, the trained significance model 225 applies the read frequency information 220 to each distribution 240 and 245. For example, the read frequency information 220 is an allele frequency (AF) for a called variant. Therefore, the occurrence distribution 240 and the magnitude distribution 245 predict the likelihood of observing the AF that was, in fact, observed.

The predicted likelihood generated by the occurrence distribution 240 and the magnitude distribution 245 may be embodied as scores, such as an occurrence score 230 and magnitude score 235, respectively. As an example, the occurrence score 230 for the occurrence distribution 240 is expressed as:

Prob(AF>baseline0|Occurrence Distribution)  (3)

In other words, the occurrence score 230 is the probability of observing a value of AF greater than a baseline noise value (e.g., baseline 0) in view of the occurrence distribution 240. In some embodiments, as discussed further below, the baseline noise value is determined through a limit of blank (LoB) analysis.

As another example, a magnitude score 235 for the magnitude distribution 245 is expressed as:

Prob(AF≥f|Magnitude Distribution)  (4)

where f is a random variable of the magnitude distribution 245. In other words, the magnitude score 235 for the magnitude distribution 245 is the probability of observing a value of AF greater than or equal to the random variable f in view of the magnitude distribution 245.

In one embodiment, the occurrence score 230 and magnitude score 235 are combined to generate the significance score 238. More generally, any function or other method of combination may be used to generate the significance score 238 from those two scores. As one example, the significance score 238 is the product of the occurrence score 230 and the magnitude score 235 and can be expressed as:

$$\text{Prob}(AF>0|\text{Occurrence Distribution}) * \text{Prob}(AF \geq f-|\text{Magnitude Distribution}) \quad (5)$$

In other embodiments, the occurrence score 230 and magnitude score 235 may be individually weighed (using additional parameters/coefficients) and combined to obtain the significance score 238. The significance score may also be referred to as a p-value.

Altogether, the significance score 238 represents a likelihood that the called variant is confounded by the presence of noise. In other words, significance score 238 provides an indication as to the likelihood that the called variant is, in fact, a false positive. In various embodiments, the significance score 238 is compared to a threshold value (e.g., a pre-defined p-value) to determine whether the called variant is a true or false positive. For example, the threshold value may be one of $5 \times 10^{-z}$ or $1 \times 10^{-z}$, where z=1, 2, 3, 4, 5, 6, or 7. In one embodiment, if the significance score 238 is less than the threshold value, the called variant is deemed a false positive. On the contrary, if the significance score 238 is greater than the threshold value, the called variant is deemed a true positive.

Training a Significance Model

Figure 2C:
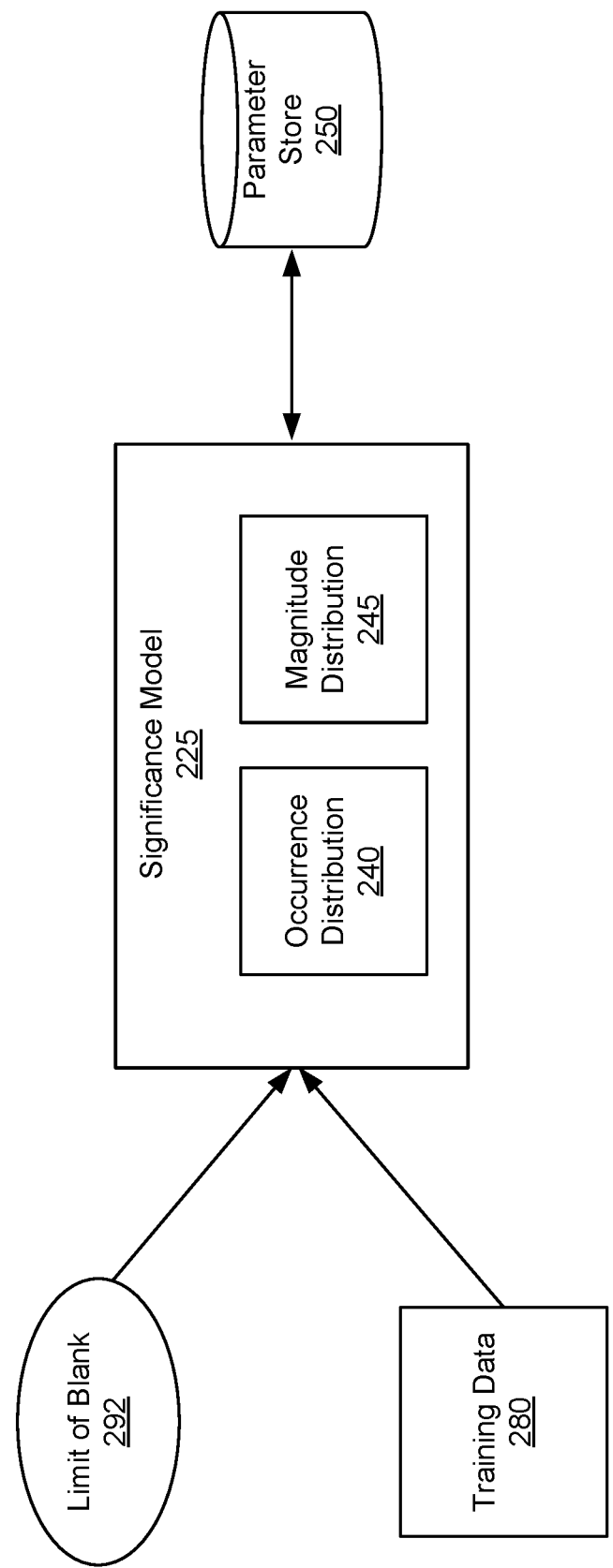
FIG. 2C depicts a process of training a significance model to generate the parameters of the occurrence and magnitude distributions, in accordance with an embodiment.

Reference is now made to FIG. 2C, which depicts a flow process 200C of training a significance model 225 to generate the parameters of the occurrence distribution 240 and magnitude distribution 245, in accordance with an embodiment. Training data 280 is provided as input to train the significance model 225 based on a limit of blank (LoB) 292 value. A LoB value refers to measurements obtained from known blank samples. In some embodiments, the significance model 225 is trained based on a limit of detection (LoD) value, which can be derived from the limit of blank value. A LoD value refers to a lowest concentration (e.g., allele frequency) that can be measurably distinguished from the LoB.

Figure 2D:
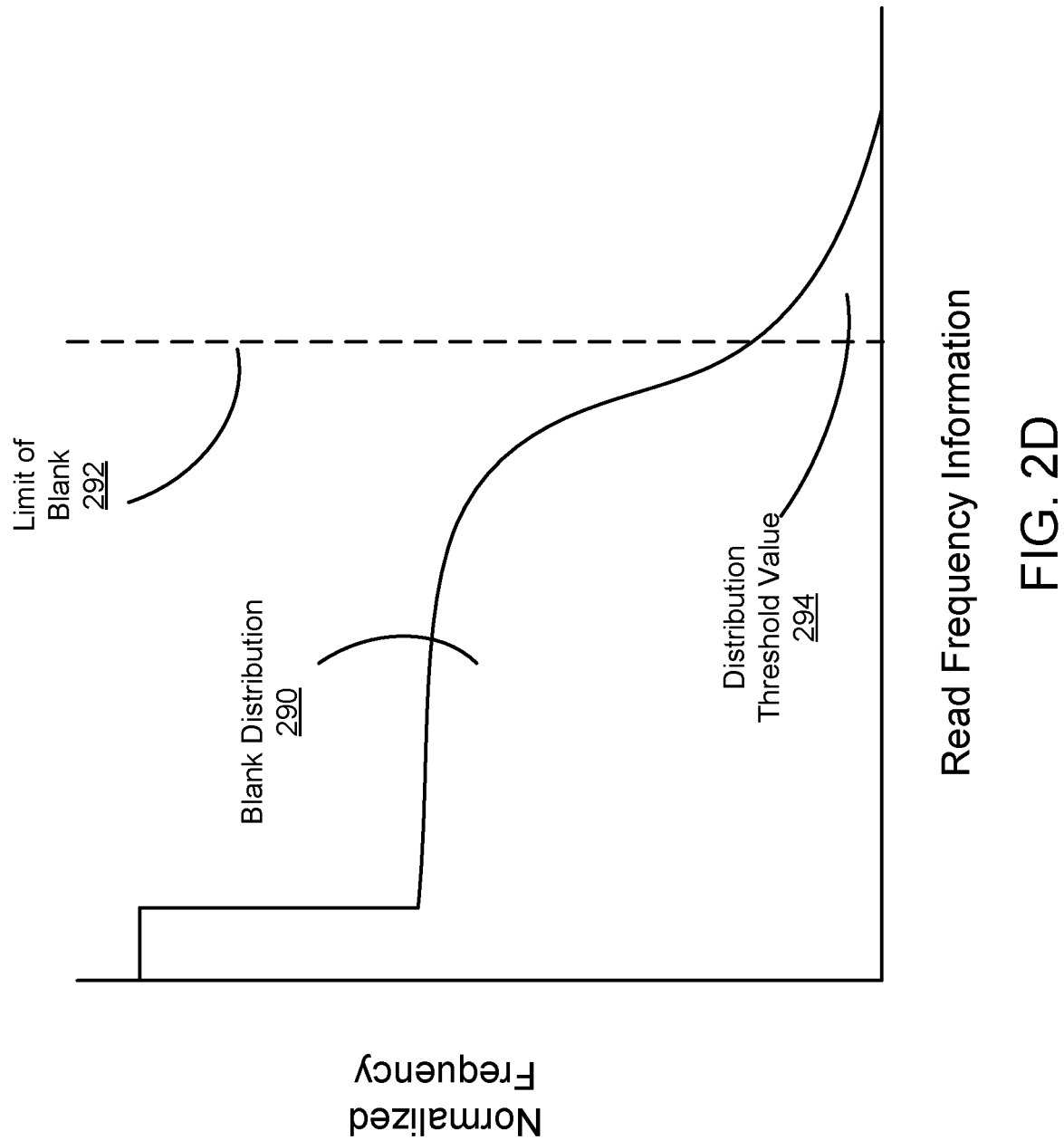
FIG. 2D depicts a process of determining a limit of blank, in accordance with an embodiment.

Referring first to the LoB 292, it represents a baseline level of noise in a read segment. Reference is now made to FIG. 2D, which depicts the determination of a limit of blank (LoB) 292 that represents the baseline noise in a sample, in accordance with an embodiment. The LoB 292 can be an experimentally determined value that, as described above, is used to set the baseline level of noise in a sample. For example, the LoB 292 is determined using measurements obtained from blank samples. Blank samples refer to samples known to be without read sequences (e.g., devoid of nucleotide sequence variants). For example, a blank sample may be composed of cfDNA samples from healthy individuals or contrived samples from Coriell genomic DNA (gDNA). Each measurement obtained from a blank sample corresponds to a read frequency (e.g., read frequency information shown on the x-axis). As an example, read frequency information can refer to an allele frequency. Here, the allele frequency derived from the blank samples can be fully attributed to measurement noise. By accumulating the measurements obtained from blank samples, a blank distribution 290 is generated.

In various embodiments, measuring the signal from multiple blank samples serves to identify the LoB 292. The LoB 292 can be expressed as:

$$\text{LoB} = \text{Mean}_{blank} + z * (\text{Standard Deviation}_{Blank}) \quad (6)$$

where z represents a z-score corresponding to a statistical level of confidence. For example, for a 95% confidence interval, z=1.96. Here, the distribution threshold value 294 represents the area under the curve of one tail of the blank distribution 290. For a 95% confidence interval, the distribution threshold value 294 is 2.5% (e.g., one tail).

In some embodiments, the LoD can be determined from the LoB value by measuring the standard deviation of signals detected from multiple blank samples or low concentration samples. The LoD can be expressed as:

$$\text{LoD} = \text{LoB} + z * (\text{Standard Deviation}_{Low\ Concentration\ Sample}) \quad (7)$$

Low concentration samples are low allele frequency samples. Examples of low allele frequency samples can include read segments of less than 0.02%, 0.03%, 0.04%, 0.05%, 0.1%, 0.2%, 0.3%, 0.4%, 0.5%, 0.6%, 0.7%, 0.8%, 0.9%, or 1% allele frequency. Returning to FIG. 2C, the training data 280 can include one or more training examples, each of which corresponds to a previously called variant. Individual training examples are each derived from a sequence read from a sample obtained from either a healthy individual or an individual with a known indication (e.g., diagnosed with cancer).

Altogether, each training example includes features and read frequency information, such as the features 210 and read frequency information 220 described above in relation to FIG. 2A. The features of a training example may include the trinucleotide context, mean coverage, and mutation type of the called variant and therefore enable the categorization of the training example in a stratification. The read frequency information for a training example enables the generation of the occurrence distribution 240 and magnitude distribution 245 for the stratification corresponding to the training example. As one example, a regression fit is applied across the read frequency information of multiple training examples of the same stratification to generate the distributions 240 and 245 and the corresponding model parameters 215 of the distributions 240 and 245. If additional training examples are received, the model parameters 215 of each distribution 240 and 245 can be tailored (e.g., the regression model can be refit) to account for the read frequency information from the additional training examples.

Figure 2E:
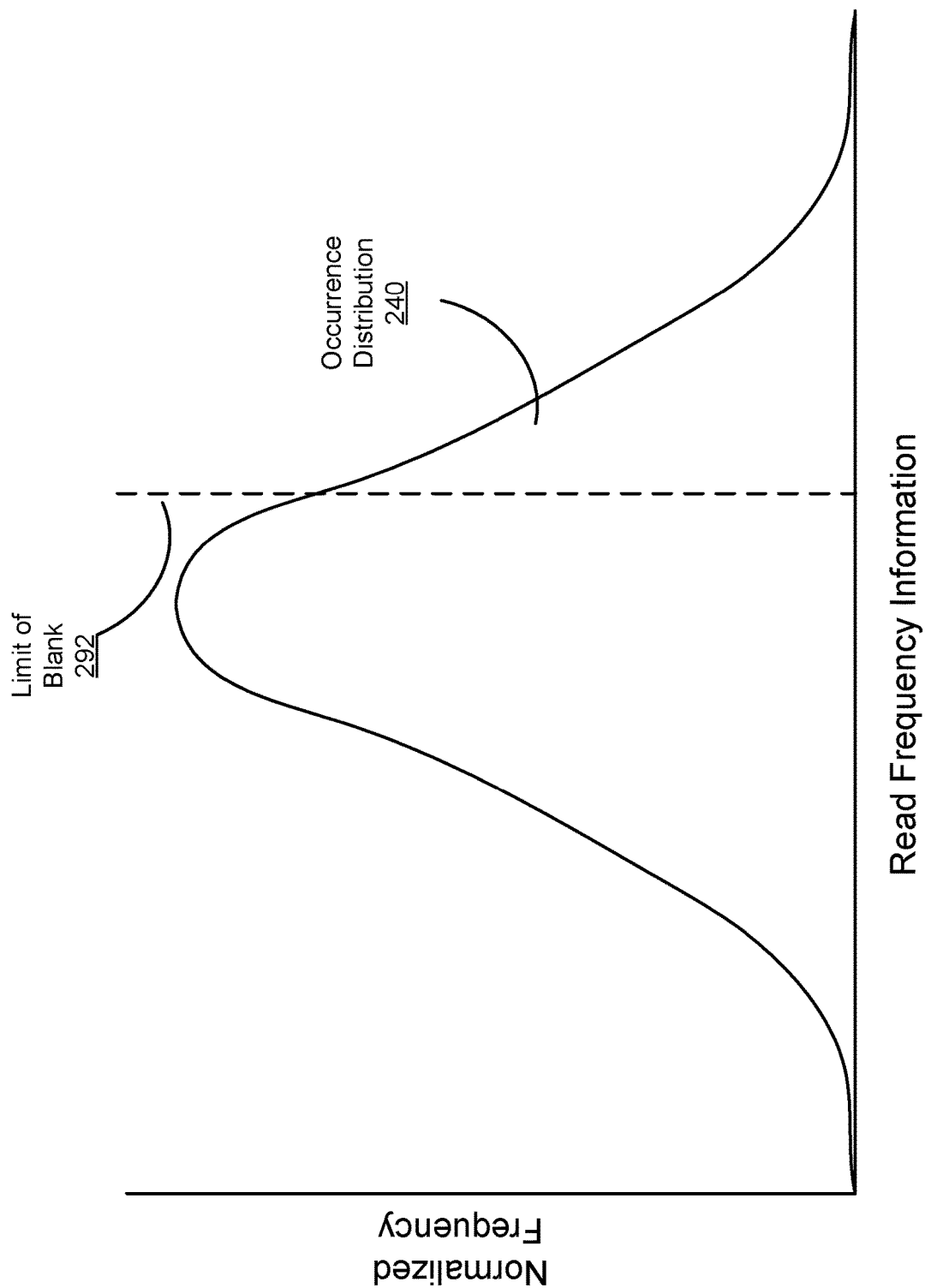
FIG. 2E depicts the identification of model parameters for an occurrence distribution, in accordance with an embodiment.
Figure 2F:
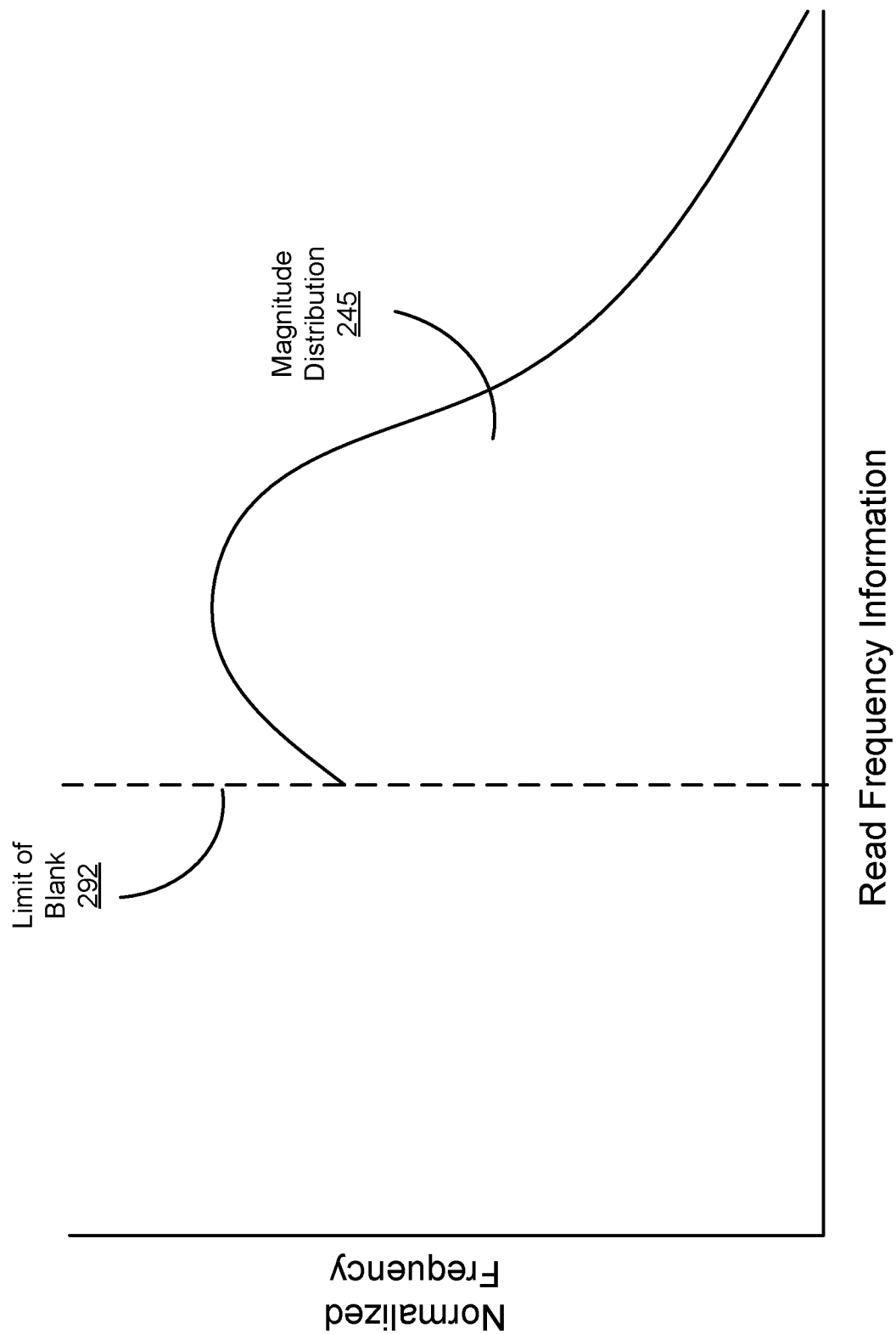
FIG. 2F depicts the identification of model parameters for a magnitude distribution, in accordance with an embodiment.

FIGS. 2E and 2F depict the process of generating the different distributions 240 and 245 of the significance model 225, in accordance with an embodiment. FIG. 2E depicts an occurrence distribution 240 relative to the LoB 292 and FIG. 2F depicts a magnitude distribution 240 relative to the LoB 292. The significance model 225 generates the occurrence distribution 240 and magnitude distribution 245 for each stratification given the range of read frequency information of training examples. As an example, each distribution 240 and 245 can be represented as a relationship between the normalized frequency (y-axis of FIG. 2E and FIG. 2F) and the read frequency information of the training examples.

The read frequency information of multiple training examples of that stratification is accumulated to generate the occurrence distribution 240 and the magnitude distribution 245. As shown in FIG. 2E, the occurrence distribution 240 may be a distribution across the full range of the read frequency information, where the full range encompasses the LoB 292 value. In one embodiment, the occurrence distribution 240 is a binomial distribution and therefore, the significance model 225 fits a binomial regression. In doing so, the n and p model parameters 215 for the occurrence distribution 240 can be obtained. In various embodiments, the occurrence distribution 240 is a different distribution. Therefore, the significance model 225 can perform a different regression fit in determining the model parameters for other types of distributions.

In the particular example shown in FIG. 2E, the area under the curve of the occurrence distribution 240 above the LoB 292 can be denoted as δ whereas the area under the curve of the occurrence distribution 240 below the LoB 292 is denoted as 1−δ. Therefore, in this example, Equation (3) above can be represented as:

$$\delta = \text{Prob}(AF > \text{baseline0} | \text{Occurrence Distribution}) \quad (8)$$

Reference now to the magnitude distribution 245 shown in FIG. 2F, the read frequency information of training examples that are above the LoB 292 value are used to generate the magnitude distribution 245. Therefore, the magnitude distribution 245 models the distribution of read frequency information that can be confidently differentiated from background noise. In one embodiment, the magnitude distribution 245 is a Weibull distribution and therefore, the significance model 225 fits a Weibull regression and obtains the λ and k parameters for the distribution.

Model parameters that define each distribution 240 or 245 for a stratification can be stored in the parameter store 250. For example, as depicted in FIG. 2B, the model parameters (e.g., $\{a_{m,n}^{1}, \ldots a_{m,n}^{x}\}$ and $\{b_{m,n}^{1}, \ldots b_{m,n}^{y}\}$) can be stored in an entry of a parameter table 255 that corresponds to a particular stratification (e.g., partition N and mutation type M). The significance model 225 can further tailor each of the occurrence distribution 240 and magnitude distribution 245 for a stratification based on read frequency information of additional training examples. As an example, for an additional training example with an identified stratification, the significance model 225 retrieves the model parameters corresponding to the stratification and can perform a re-fit of the distribution to obtain updated model parameters that can then be stored in the parameter store 250.

General Process of Training and Applying a Significance Model

Figure 3:
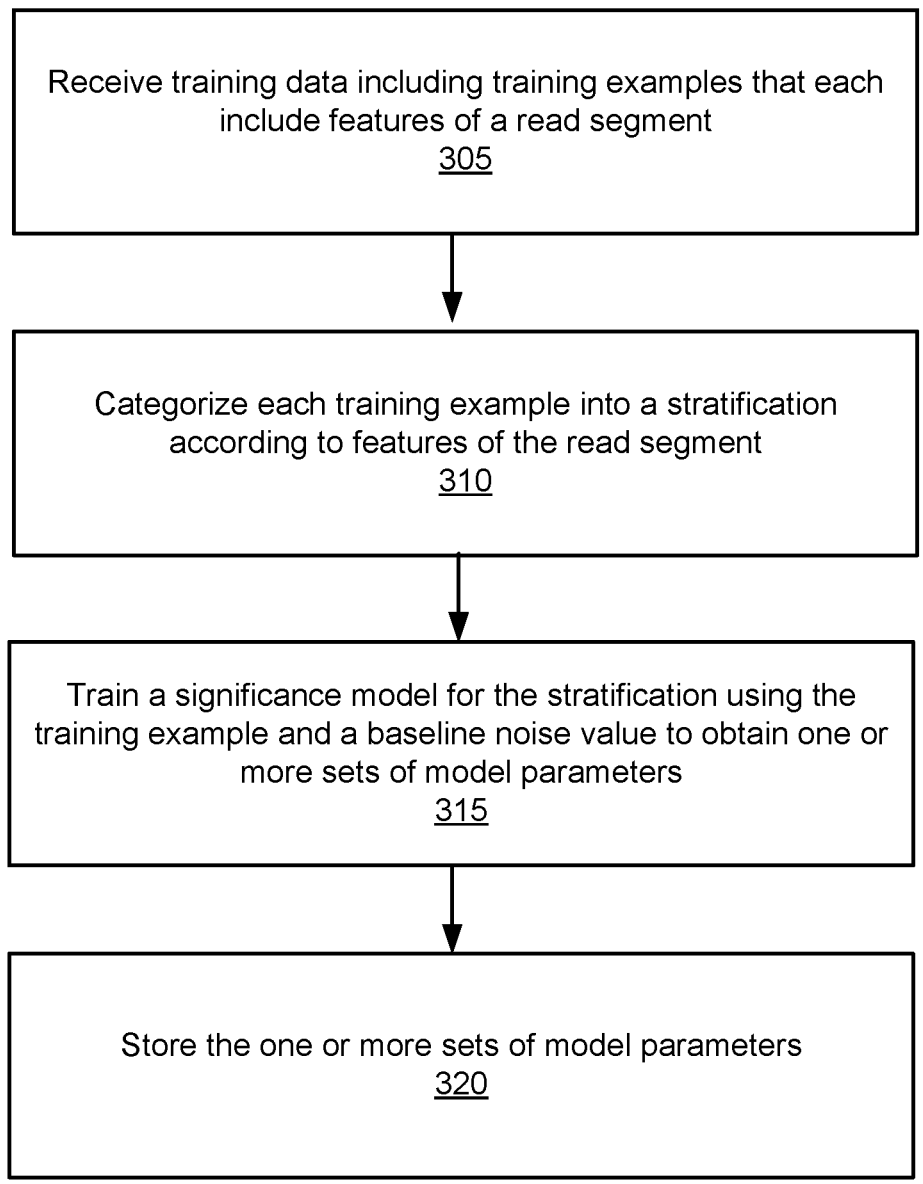
FIG. 3 depicts a flow process of training a significance model, in accordance with an embodiment.

FIG. 3 depicts a flow process 300 of training a significance model 225, in accordance with an embodiment. At step 305, training data including multiple training examples are received. Each training example includes one or more of features of a read segment as well as read frequency information for the read segment. At step 310, each training example is stratified based on the features of the read segment. For example, the training example may be categorized in a stratification based on a partition and a mutation type that is included or derived from the features of the training example.

At step 315, a significance model 225 is trained for a stratification. For example, as described above, one or more distributions 240 or 245 of the significance model 225 are generated using the read frequency information of the training examples. In various embodiments, at least one of the distributions 240 or 245 is generated depending on a baseline noise value (e.g., LoB 292). Each distribution 240 or 245 can be fit to a regression model (e.g., a Weibull distribution, binomial distribution, and the like) and the parameters of each distribution 240 or 245 can be iteratively tailored over additional training examples. Altogether, a set of model parameters 215 is obtained for each distribution 240 or 245. At step 320, each of the one or more sets of parameters are stored for later retrieval.

Reference is now made to FIG. 4, which depicts a flow process 400 of applying a trained significance model 225, in accordance with an embodiment. At step 405, a target read segment is received. As an example, the target read segment may be a called variant. At step 410, features 210 of the target read segment are extracted. Features 210 may include genomic features that are related to the called variant, such as the trinucleotide context and/or mean coverage, as well as a mutation type. At step 415, a stratification for the called variant is identified based on the features 210.

At step 420, model parameters 215 for the significance model 225, such as the model parameters stored at step 320, are retrieved. The significance model 225 includes multiple distributions and therefore, a set of model parameters 215 for each distribution is retrieved. In particular, the retrieved model parameters 215 correspond to the stratification of the called variant. For example, the retrieved model parameters 215 may have been previously generated by training a significance model using training examples that were similarly categorized in the same stratification.

At step 425, the significance model 225 is applied to read frequency information of the target read segment. Specifically, the occurrence distribution 240 and the magnitude distribution 245 of the significance model 225 are applied to determine the likelihoods, such as an occurrence score 230 and magnitude score 235, of observing the read frequency information in view of each of the occurrence distribution 240 and the magnitude distribution 245, respectively.

The occurrence score 230 and magnitude score 235 are combined to generate significance score 238, which may be a p-value. As an example, the significance score is a product of the occurrence score 230 and the magnitude score 235. At step 430, the significance score 238 is used to report whether the target read segment, such as a called variant, is a true variant or a false positive variant. For example, the significance score 238 can be compared to a threshold value, such as a p-value. Specifically, if the significance score 238 is less than the threshold value, the target read segment is characterized as a false positive variant.

Computer Implementation

Figure 13:
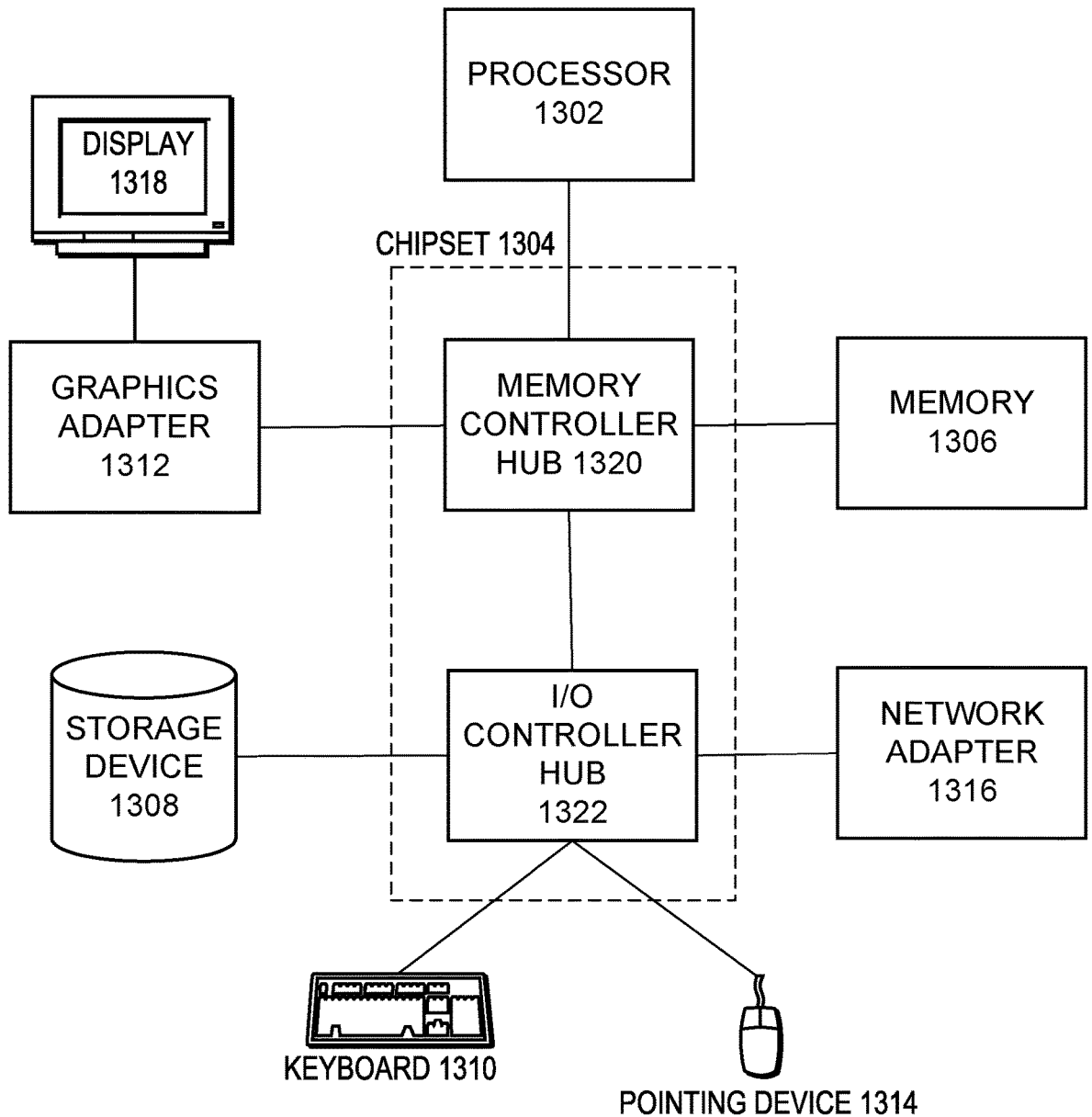
FIG. 13 depicts a high-level block diagram illustrating physical components of a computer that may be used as part of a system to carry the methods described herein, in accordance with an embodiment.

Reference is now made to FIG. 13 which depicts a high-level block diagram illustrating physical components of a computer that may be used as part of a system to carry the methods described herein, in accordance with an embodiment. Although FIG. 13 depicts a computer 1300, the figure is intended as functional description of the various features which may be present in computer systems than as a structural schematic of the implementations described herein. In practice, and as recognized by those of ordinary skill in the art, items shown separately could be combined and some items could be separated. For example, instances of the illustrated computer 1300 may be a computing device that performs steps of the example partial process workflow or the full process workflow for processing a test sample shown in FIGS. 1A-C. In addition, any of the processes or steps thereof described in FIGS. 2A-F, 3, and 4 may be performed by the illustrated computer 1300. For example, an embodiment of the computer 1300 may be used to train 300 the significance model 225 as described in FIG. 3 and subsequently used to apply 400 the significance model 225 as described in FIG. 4. Likewise, an embodiment of the computer 1300 may be used to generate any of results data described in the numerous examples below.

Illustrated in FIG. 13 are at least one processor 1302 coupled to a chipset 1304. Also coupled to the chipset 1304 are a memory 1306, a storage device 1308, a keyboard 1310, a graphics adapter 1312, a pointing device 1314, and a network adapter 1316. A display 1318 is coupled to the graphics adapter 1312. In one embodiment, the functionality of the chipset 1304 is provided by a memory controller hub 1320 and an I/O hub 1322. In another embodiment, the memory 1306 is coupled directly to the processor 1302 instead of the chipset 1304. In some embodiments, the computer 1300 includes one or more communication buses for interconnecting these components. The one or more communication buses optionally include circuitry (some-times called a chipset) that interconnects and controls communications between system components.

The storage device 1308 is any transitory or non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 808 can also be referred to as persistent memory. The pointing device 1314 may be a mouse, track ball, or other type of pointing device, and is used in combination with the keyboard 1310 to input data into the computer 1300. The graphics adapter 1312 displays images and other information on the display 1318. The network adapter 1316 couples the computer 1300 to a local or wide area network.

The memory 1306 holds instructions and data executed by the processor 1302. The memory 1306 can be non-persistent memory, examples of which include high-speed random access memory, such as DRAM, SRAM, DDR RAM, ROM, EEPROM, flash memory.

As is known in the art, a computer 1300 can have different and/or other components than those shown in FIG. 13. In addition, the computer 1300 can lack certain illustrated components. In one embodiment, a computer 1300 acting as a server may lack a keyboard 1310, pointing device 1314, graphics adapter 1312, and/or display 1318. Moreover, the storage device 1308 can be local and/or remote from the computer 1300 (such as embodied within a storage area network (SAN)).

As is known in the art, the computer 1300 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 1308, loaded into the memory 1306, and executed by the processor 1302.

EXAMPLES

The following examples are put forth so as to provide those of ordinary skill in the art with a complete disclosure and description of how to make and use the subject invention, and are not intended to limit the scope of what is regarded as the invention. Efforts have been made to ensure accuracy with respect to the numbers used (e.g. amounts, temperature, concentrations, etc.) but some experimental errors and deviations should be allowed for. It will be appreciated by those of skill in the art that, in light of the present disclosure, numerous modifications and changes can be made in the particular embodiments exemplified without departing from the intended scope of the invention.

Example 1: Tradeoff Between Sensitivity and Specificity

Figure 5A:
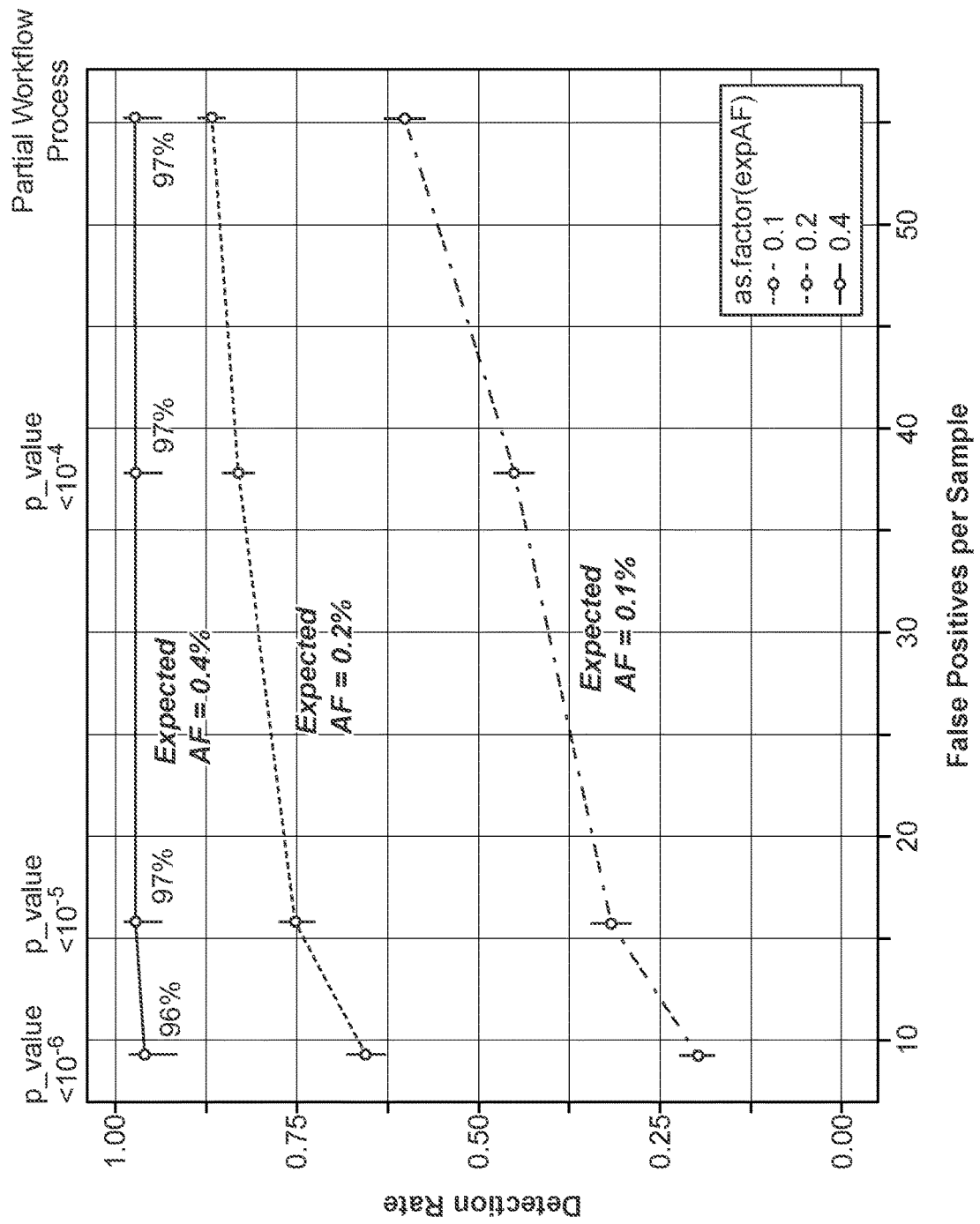
FIG. 5A depicts the tradeoff between sensitivity (e.g., detection rate) and specificity (e.g., false positives per sample), in accordance with an embodiment.

FIG. 5A depicts the tradeoff between sensitivity (e.g., detection rate) and specificity (e.g., false positives per sample), in accordance with an embodiment. In this example, the tradeoff between sensitivity and specificity of applying the significance model is shown in relation to samples processed using the partial workflow process of FIG. 1A without the application of the significance model.

The expected allele frequency (expected AF) of different variants was experimentally determined using a cfDNA titration study. Referring to the most stringent criteria for removal of false positives in step 145 (e.g., $p<10^{-6}$), for each expected AF (e.g., expected AF=0.1%, 0.2%, 0.4%), a large number of false positives were removed by step 145 (e.g., <10 false positives per sample) in comparison to the least stringent criteria (e.g. variants called by the partial workflow process with only step 130). However, for variants with lower expected AF (e.g., expected AF=0.1% or 0.2%), the detection rate similarly dropped at the most stringent criteria of $p<10^{-6}$ in comparison to larger p-values. Importantly, the detection rate across different p-values for samples with an expected AF of 0.4% was largely unchanged. For example, at $p<10^{-6}$, 96% of the expected variants were detected whereas similarly at $p<10^{-4}$, 97% of the expected variants were detected. This indicates that the LoD is likely to be under 0.4%. The goal of the application of a significance model, as described herein, is to improve the tradeoff between sensitivity and specificity of samples with read segments at various allele frequencies.

Example 2: Example Experimental Setup

Figure 5B:
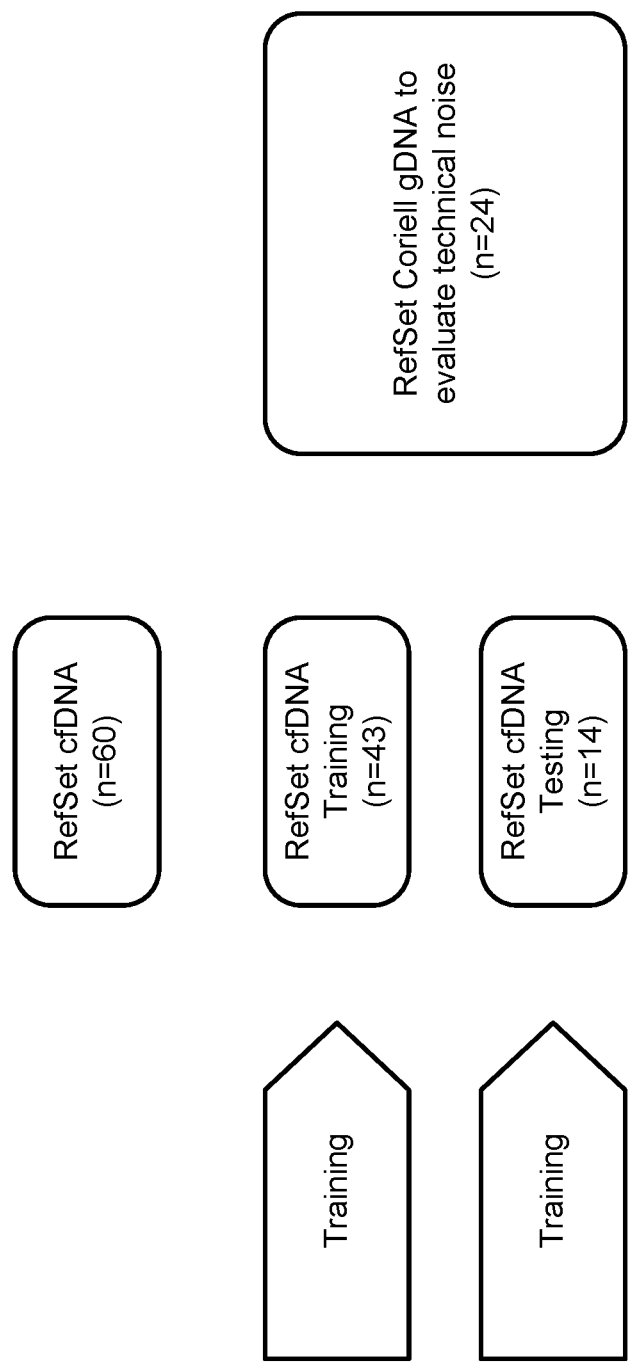
FIG. 5B depicts an overall experimental setup for training and testing a significance model, in accordance with an embodiment.

FIG. 5B depicts an example experimental setup for training and testing a significance model. In this example, a total of n=60 healthy human cfDNA samples were obtained from an experiment titled "RefSet experiment". Of those, three samples were excluded due to likely contamination issues. The remaining cfDNA samples were divided into a training dataset (n=43) for training the significance model and a testing dataset (n=14) for testing the significance model. Additionally, n=24 genomic DNA samples (gDNA) were obtained for training the significance model and for evaluating the technical noise.

Each of the samples were processed using the process flow 100 depicted in FIG. 1B and the flow 1200 shown in FIG. 12. First, sequence reads for each sample were obtained (e.g., step 105). Two tubes of whole blood were drawn into Streck blood collection tubes from healthy individuals (self-reported as no cancer diagnosis). After plasma was separated from the whole blood, it was stored at −80° C. Upon assay processing, cfDNA was extracted and pooled from two tubes of plasma. Coriell genomic DNA (gDNA) were fragmented to a mean size of 180 base pairs and then size selected to a tighter distribution using magnetic beads. The library preparation protocol was optimized for low input cfDNA and sheared gDNA. UMIs were incorporated into the DNA molecules during adapter ligation. Flowcell clustering adapter sequences and dual sample indices were then incorporated at library preparation amplification with PCR. Libraries were enriched using a targeted capture panel. Target DNA molecules were first captured using biotinylated single-stranded DNA hybridization probes and then enriched using magnetic streptavidin beads. Non-target molecules were removed using subsequent wash steps. The HiSeq X Reagent Kit v2.5 (Illumina; San Diego, CA) was used for flow-cell clustering and sequencing. Four libraries per flow-cell were multiplexed. Dual indexing primer mix was included to enable dual sample indexing reads. The read lengths were set to 150, 150, 8, and 8, respectively for read 1, read 2, index read 1, and index read 2. The first 6 base reads in read 1 and read 2 are the UMI sequences.

The obtained sequence reads for each sample were processed through steps 110-125 to obtain a data file of called variants for each sample. The data file of called variants were provided to the significance model for either training the significance model or application of the significance model in accordance with the process described in the section titled "Training a Significance Model" above.

Example 3: False Positive Called Variants Arise from Technical Bias

Having trained the significance model, the training datasets (e.g., cfDNA training dataset and gDNA training dataset) as well as the cfDNA testing dataset were used to evaluate the significance model. Each of these datasets were applied as input to the significance model to determine significance information that is used to differentiate true variants from false positive variants. The true variants and false positive variants were categorized according to their respective trinucleotide context. For example, FIG. 6A depicts an example graph of the frequency of detected false positives in the cfDNA training dataset as a function of trinucleotide sequences.

Figure 6A:
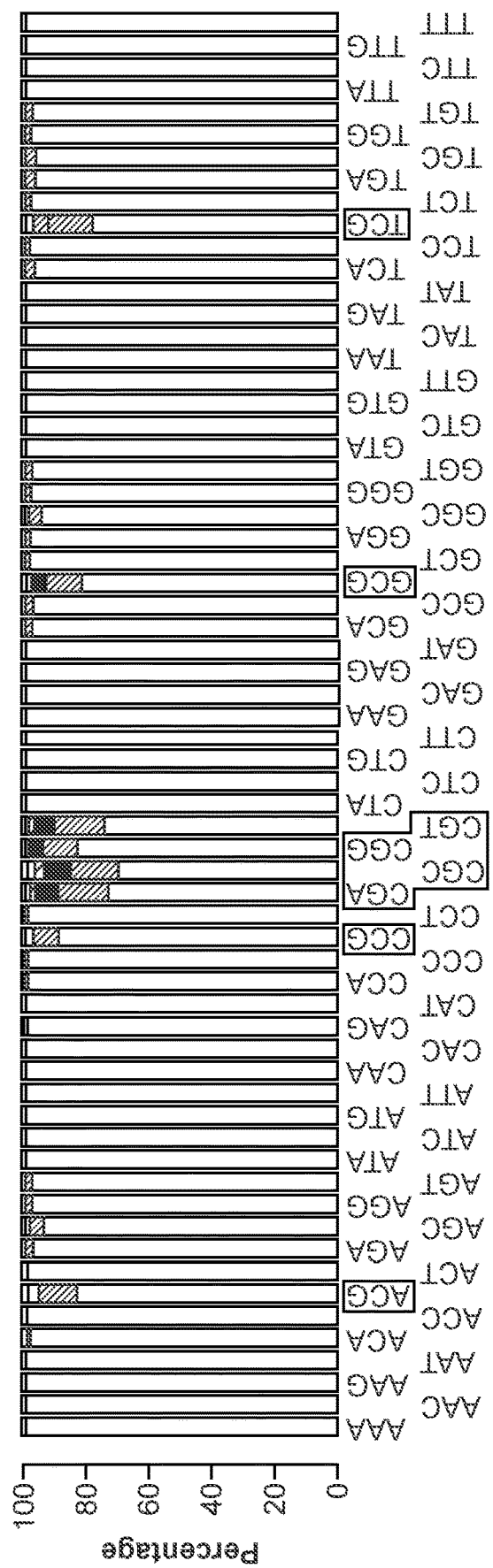
FIG. 6A depicts an example graph of the frequency of detected false positives in the cell free DNA training dataset as a function of trinucleotide sequences, in accordance with an embodiment.

In FIG. 6A, true variants are blocks filled white whereas false positive variants are filled with other patterns or colors. Therefore, FIG. 6A depicts a high proportion of false positive variants for the trinucleotide sequences of ACG, CCG, CGA, CGC, CGG, CGT, GCG, and TCG. Each of these identified trinucleotide sequences were of the CGx or xGC variety, where x is any nucleotide base. Therefore, this suggests that the trinucleotide context of CGx or xGC is correlated with disproportionately higher levels of falsely called variants. Although not shown, similar trends (e.g., higher levels of falsely called variants in CGx or xGC trinucleotide sequences) were also observed in both the gDNA training dataset and the cfDNA testing dataset. This suggests that the higher levels of false positive variants in these particular trinucleotide sequences is likely due to a process related technical bias. Furthermore, given the likelihood of a process related technical bias, this supports the notion that partitioning called variants with the CGx or xGC trinucleotide context can be valuable in further differentiating false positive called variants and true variants.

To further support the basis for partitioning called variants based on trinucleotide context, the number of false positive called variants was evaluated across possible partitions. FIG. 6B depicts an example of counts of chromosome/positions of identified false positives (FP) in three different partitions for the cfDNA training dataset, the cfDNA testing dataset, and the gDNA dataset, as well as percentages of those reads relative to the total number of chromosome/positions in each partition for each dataset. In particular, the called variants in each of the datasets were divided into the following three different partitions:

Partition 1: The trinucleotide context of the called variant is not CGx or xCG, where x is any nucleotide base.
Partition 2: The trinucleotide context of the called variant is CGx or xCG, and additionally, the mean coverage is between 2000 and 6000.
Partition 3: The trinucleotide context of the called variant is CGx or xCG, and additionally, the mean coverage is either less than 2000 or greater than 6000.

Of note, a large proportion (95%) of the total number of read segments (summed across all samples from the cfDNA training/testing datasets and the gDNA dataset) fall into partition 1 with a smaller proportion (4%) in partition 2 and an even smaller proportion (1%) in partition 3. However, in all three datasets, a significantly higher proportion of false positives were identified in partition 2, in comparison to partitions 1 and 3. For example, for the cfDNA training dataset, 25% of the read segments in partition 2 were identified as false positives in comparison to far lower percentages (1.6% and 4%) for the other partitions (partitions 1 and 3 respectively). The same trend holds true for both the cfDNA testing dataset and the gDNA dataset. The fact that the same trend holds for the gDNA dataset further corroborates the fact that the higher proportion of false positives that arise in the CGx and xGC trinucleotide context (partitions 2 and 3) are likely due to technical bias arising from the processing workflow.

Importantly, the number of false positives identified in a partition of each cfDNA dataset scales according to the sample size of the dataset. This suggests that the false positives are randomly distributed across the partitions and establishes that partitioning the samples in this manner does not introduce an additional bias related to sample size. Specifically, the sample size of the cfDNA training dataset (n=43) is approximately three times the sample size of the cfDNA testing dataset (n=14). Similarly, the number of false positives identified in partitions 1, 2, or 3 in the cfDNA training dataset is also approximately three times the number of false positives identified in the corresponding partitions of the cfDNA testing dataset.

Example 4: Further Stratification of Datasets

The partitioned cfDNA datasets (training and testing datasets) were further investigated to determine whether further stratification of the datasets can assist in differentiating false positive called variants and true variants. Samples were processed using the assay process described above in relation to Example 2.

For example, each of the called variants was categorized according to a mutation type such as transversion, transition, or oxidation. FIG. 7 depicts an example of quantified totals of mutation types in each of three partitions for the cfDNA datasets. Similar to FIG. 6, a large proportion of read segments are partitioned in partition 1 with smaller quantities in partitions 2 and 3. Interestingly, a significantly higher proportion of transition (e.g., A to G or vice versa and C to T or vice versa) mutations relative to transversions and oxidations were observed in partition 2. This stratification provides a further level of granularity that the likely source of the technical bias is a transition based mutation with a CGx or xGC trinucleotide context. Called variants of each partition and mutation type combination were evaluated for noise which revealed that the level of noise in each stratification differed. Therefore, this supports the training of a significance model for each of a partition and mutation type combination.

Example 5: Modeling Random Noise Using a Zero-Inflated Weibull Distribution

The trained significance model was evaluated using the cfDNA datasets (training and testing). Specifically, the trained significance model determines the probability of observing a particular allele frequency (AF) in view of the trained distributions. Together, the trained distributions form a zero-inflated Weibull distribution where the zero-inflation arises from the baseline noise level that is determined through the limit of blank analysis.

For example, the first distribution of the zero-inflated Weibull distribution model predicts the probability of the occurrence of noise under a binomial distribution. Generally, under the binomial distribution:

$$\text{Prob}(AF>0)=\delta \text{ and } \text{Prob}(AF=0)=1-\delta \quad (9)$$

When predicted AF>0, then the second distribution of the zero-inflated Weibull distribution model predicts the probability of a magnitude of the observed AF under the Weibull distribution:

$$Prob(AF \le X) = 1 - e^{-(\frac{x}{\lambda})^k} \quad (10)$$

where k is the shape parameter and λ is the scale parameter.

Overall, the probability for an observed allele frequency (AF) for a called variant is calculated as follows:

Probability(AF)=Prob(AF>baseline"0"|binomial distribution)*Prob(AF>*f*|Weibull distribution)  (11)

Therefore, the probability of observing an AF for a called variant can be simplified by combining equations 8-10 to:

$$Probability(AF) = \delta * \left(e^{-\left(\frac{AF}{k}\right)^k}\right) \quad (12)$$

Figure 8A:
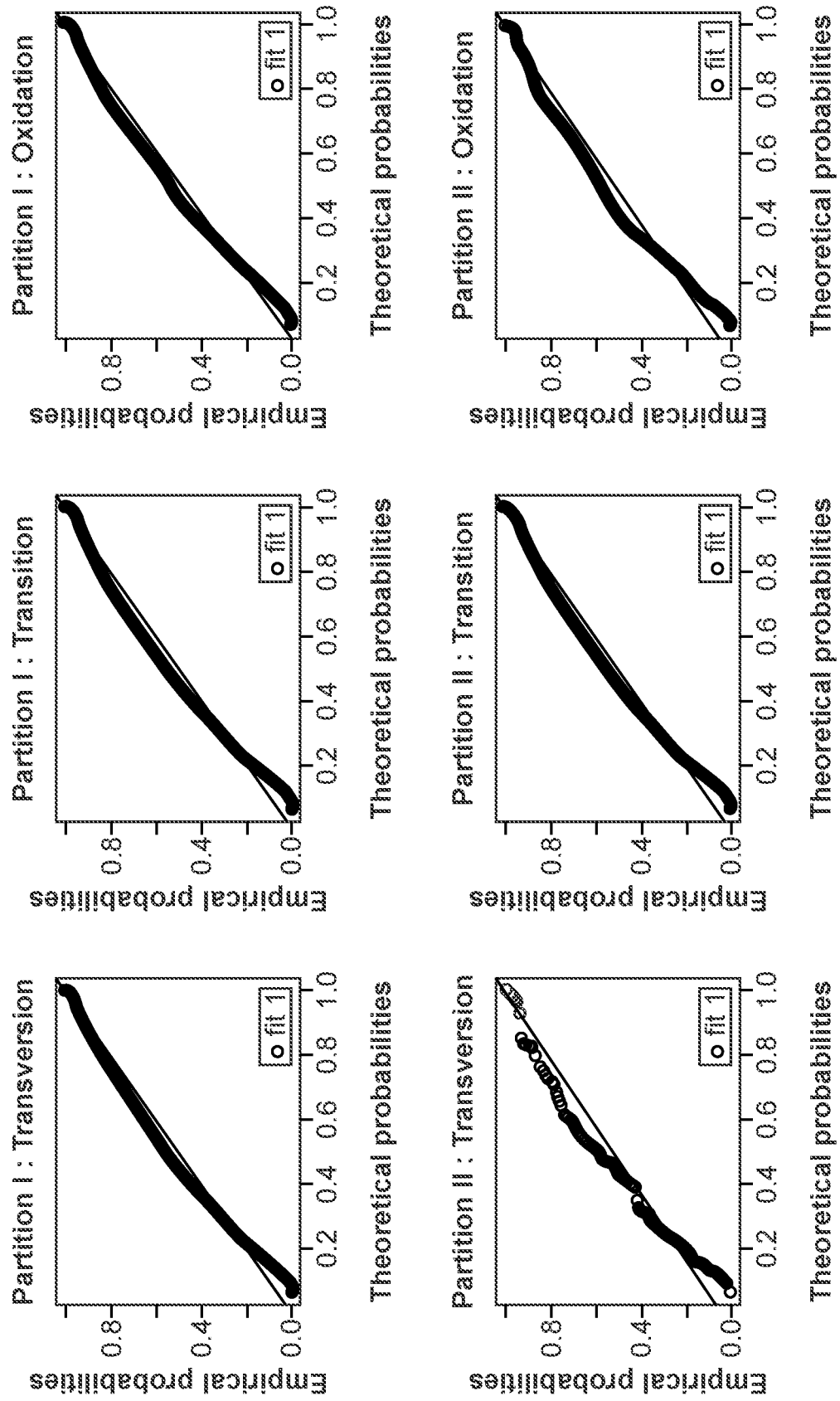
FIGS. 8A and 8B depict example probability-probability plots describing the relationship between empirical and theoretical probabilities for a zero-inflated Weibull distribution model of random noise based on a cell free DNA training data set, in accordance with an embodiment.
Figure 8B:
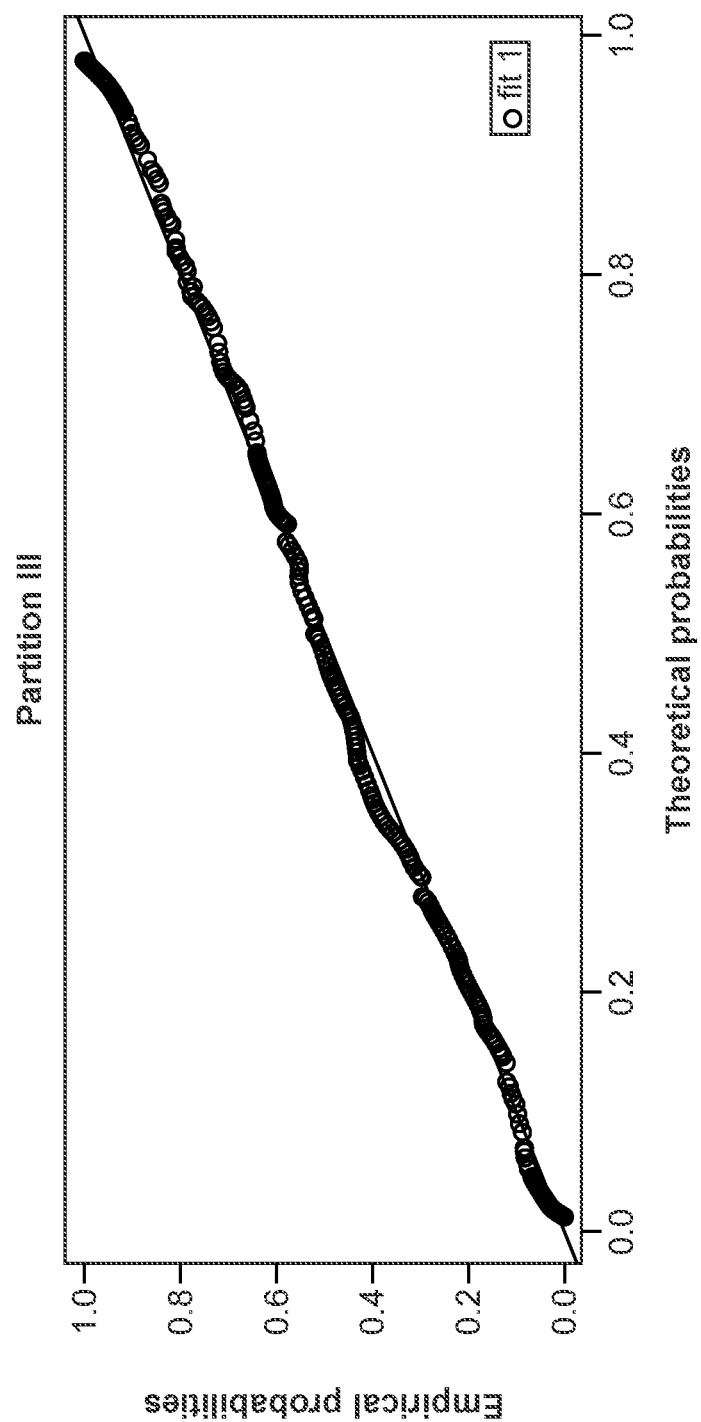

FIG. 8A and FIG. 8B depict example probability-probability plots describing the relationship between empirical and theoretical probabilities for a zero-inflated Weibull distribution model of random noise based on the cfDNA training dataset. Specifically, FIG. 8A depicts linear fits between the empirical probability predicted by the significance model and the theoretical probability for three different mutation types of partition I and partition II. FIG. 8B depicts linear fits between the empirical probability predicted by the significance model and the theoretical probability for partition III. Overall, the significance model is a good predictor of noise in a sample for each partition and mutation type.

Example 6: Comparing the Detection of True Variants in cfDNA and the Matching Solid Tumor Samples Two different processes for calling variants, each process using the steps of the process shown in FIG. 1A (e.g., partial process) or the steps of the process shown in FIG. 1B (e.g., full process), was used to identify true variants in cfDNA samples obtained from healthy and cancer patients from. cfDNA samples were obtained from patients with one of breast cancer, lung cancer, or prostate cancer through a blood draw. Specifically, at least 50 patients of each type of cancer (breast, lung, and prostate cancer) were enrolled to obtain ~50 evaluable patients. For all participating patients, blood was drawn contemporaneously within 6 weeks of (prior to or after) biopsy.

Variants were called from each cfDNA sample using one of two methods. A first process, the partial process workflow discussed above, includes steps 100-130 without the application of a significance model and/or removal of false positives based on significance information (e.g., step 140 and/or step 145). A second process, hereafter referred to as the full process or full workflow, includes the full process shown in FIG. 1B which includes the application of the significance model (e.g., step 140) and removal of false positives (e.g., step 145). Of note, both the partial process and full process were used only to identify variants from cfDNA. Samples were obtained and processed using the assay process described above in relation to Example 2. Additionally, eight cancer patients were found to have possibly exhibited apolipoprotein B mRNA editing catalytic polypeptide family of enzyme (APOBEC) mutational signature, manifested as a large number of C→T or C→G mutations arising from TCx trinucleotide context. These patients were referred to as hypermutators. Many of these signature mutations called in cfDNA were not reported in the matching tumors. These hypermutators were not included in the results shown here in FIGS. 9 and 10.

These variants identified using the partial or full process were compared to a conventional method. As referred to hereafter, the conventional method refers to the identification of genomic variations from solid tumor samples using a conventional process for calling variants from tissue biopsy samples.

Figure 9A:
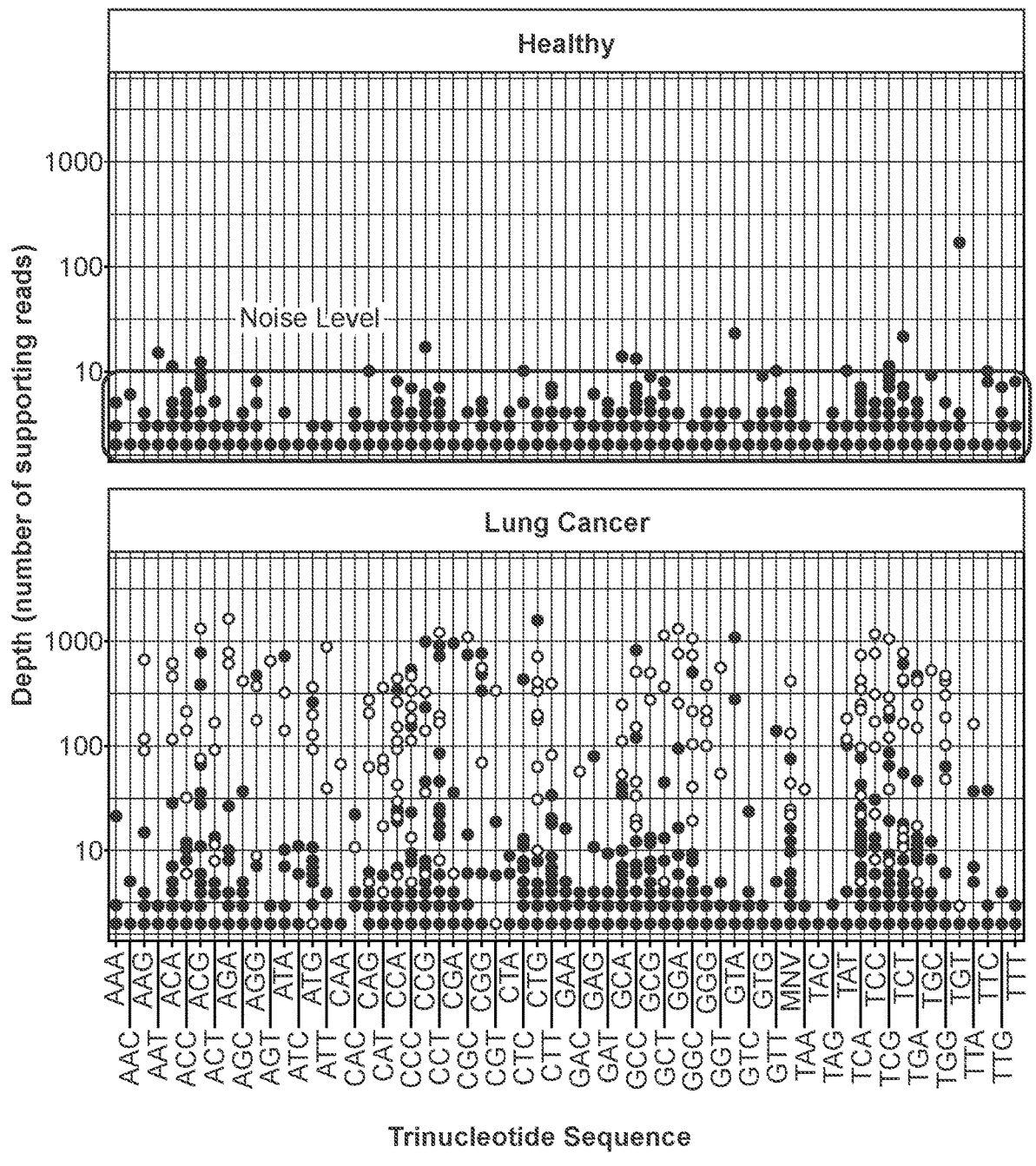
FIGS. 9A & 9B depict called variants from cfDNA samples obtained from healthy and cancer patients using a partial process shown in FIG. 1A in comparison to called variants using the conventional method, in accordance with an embodiment.
Figure 9B:
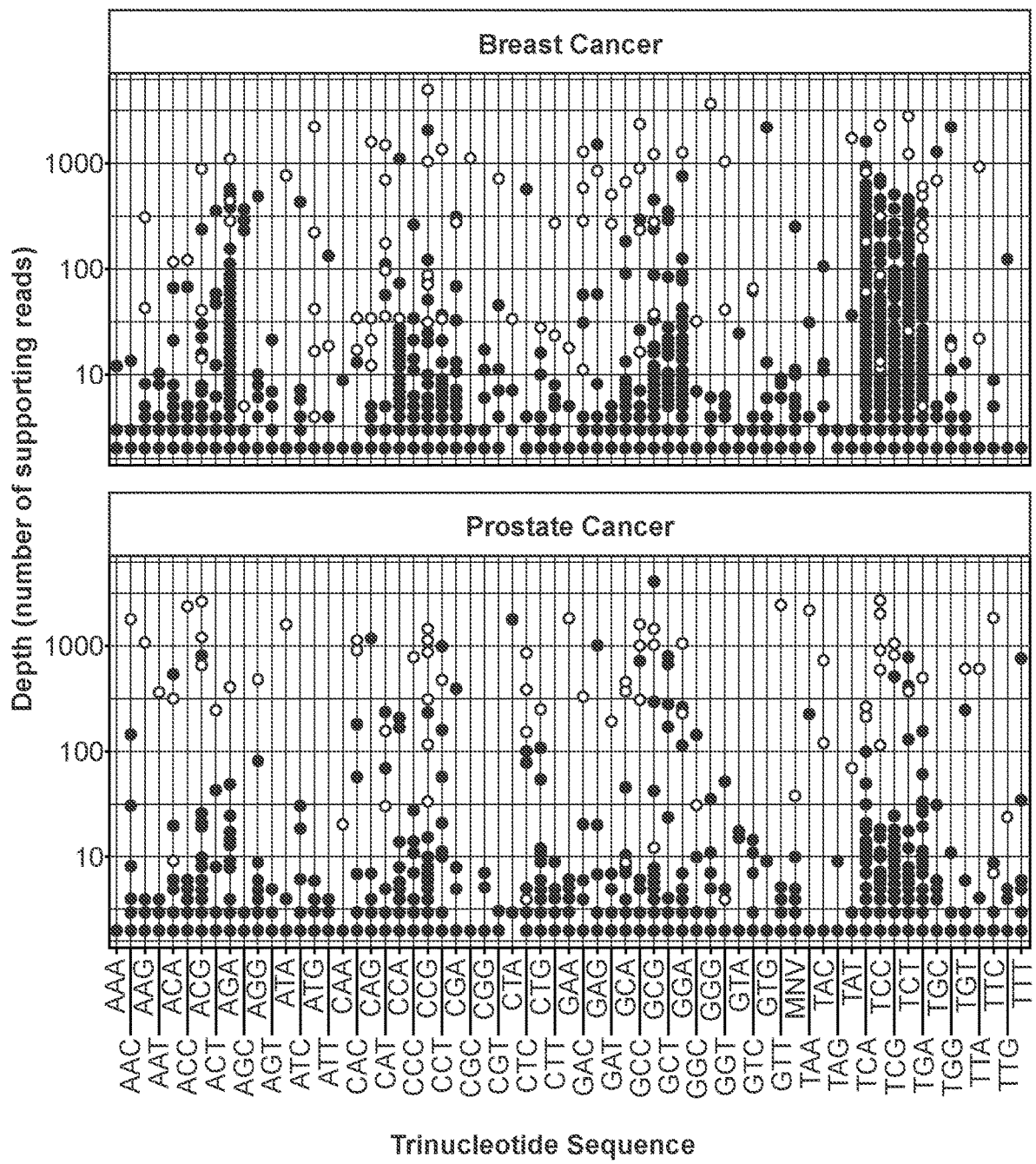

FIGS. 9A & 9B depict called variants from cfDNA samples obtained from healthy and cancer patients using the partial workflow process in comparison to called variants from tissue biopsy samples using the conventional method. Additionally, FIGS. 10A & 10B depict called variants from cfDNA samples obtained from healthy and cancer patients using the full workflow process.

Figure 10A:
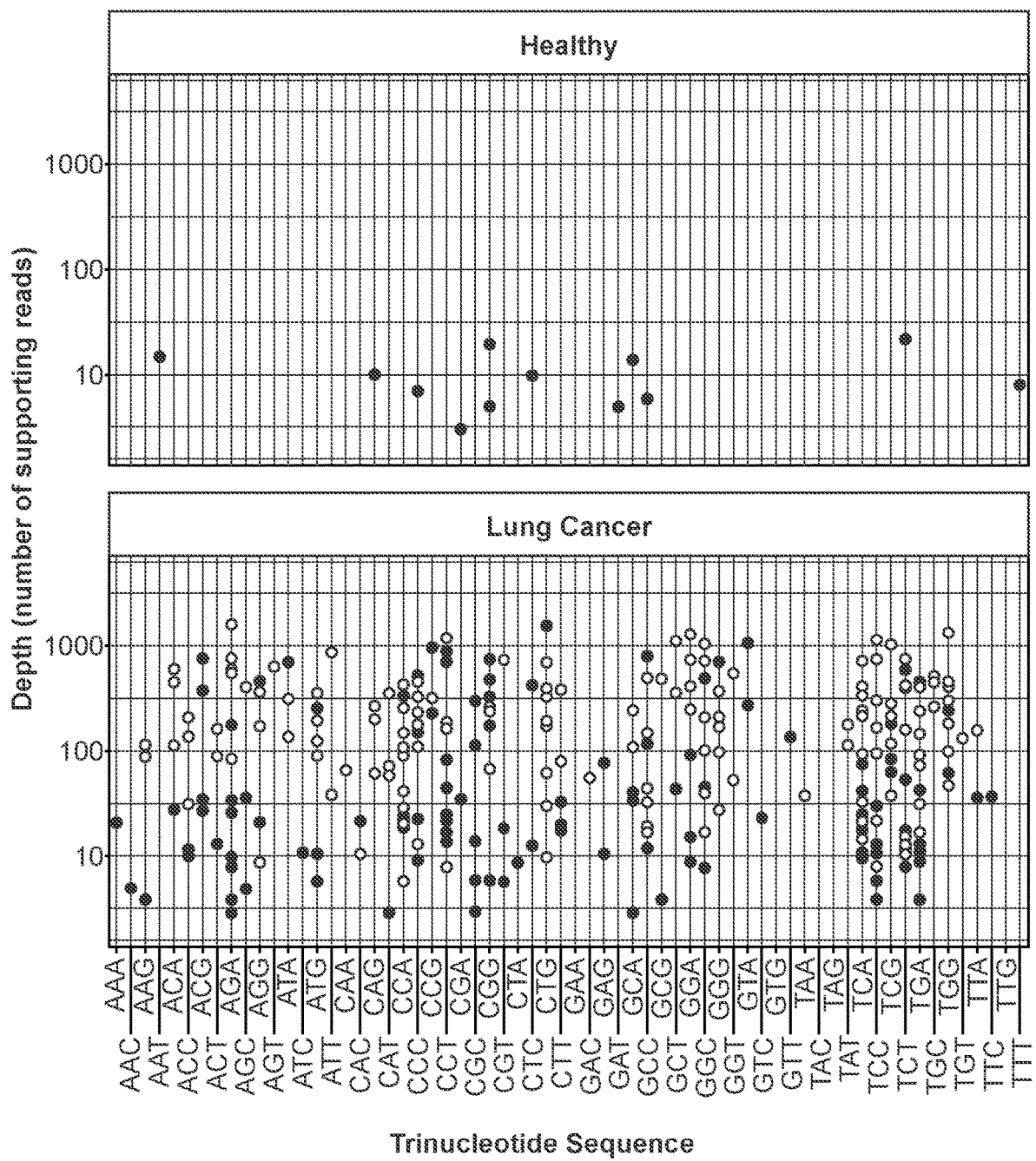
FIGS. 10A & 10B depict called variants from cfDNA samples obtained from healthy and cancer patients using a full process shown in FIG. 1B in comparison to called variants using the conventional method, in accordance with an embodiment.
Figure 10B:
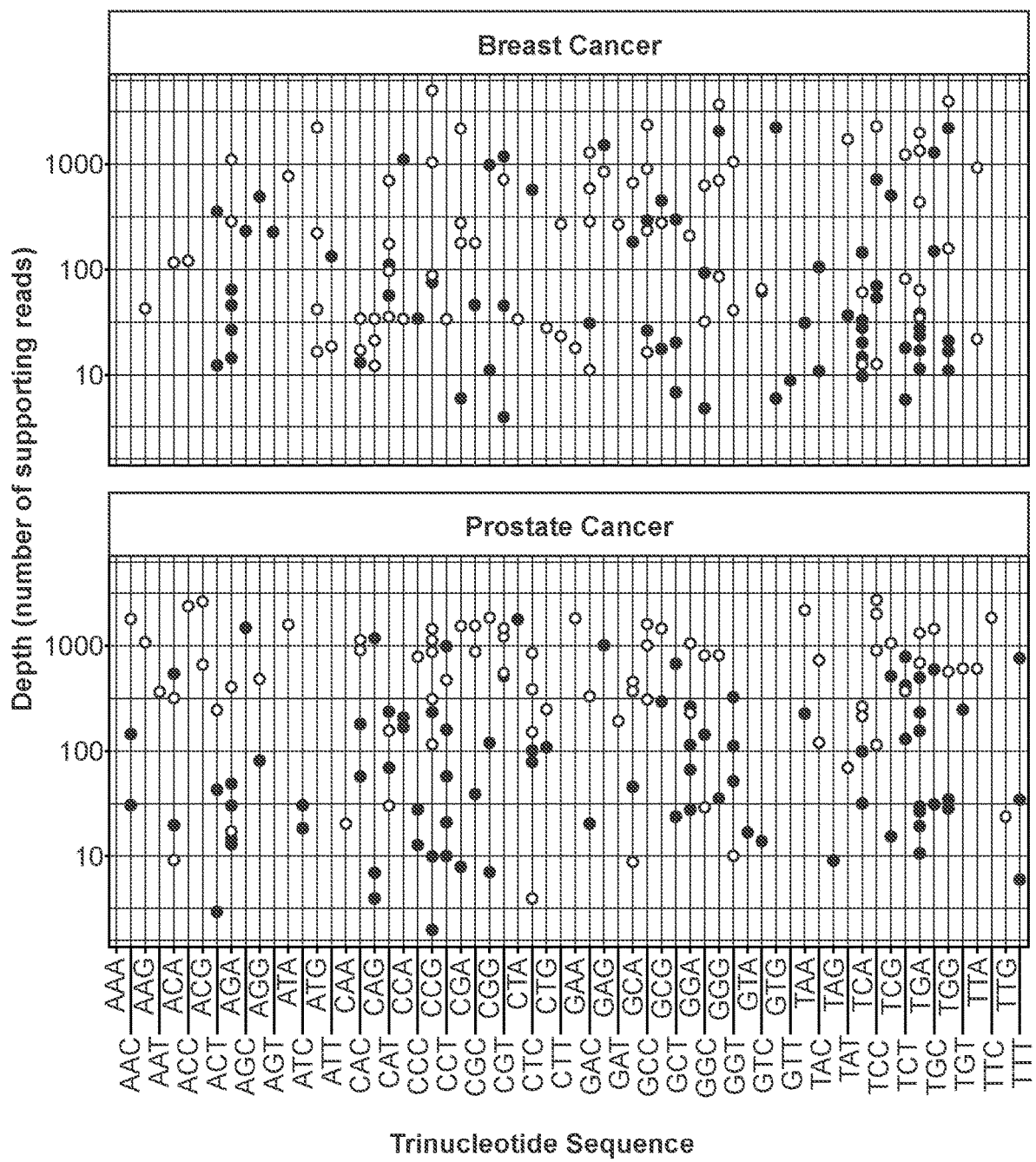

FIGS. 9A, 9B, 10A, and 10B depict called variants for healthy patients, breast cancer patients, lung cancer patients, and prostate cancer patients. A p-value threshold of $5 \times 10^{-5}$ was used to identify the called variants. Each individual graph is indexed on the x-axis by trinucleotide sequences and indexed on the y-axis by the detected number of supporting reads for a particular called variant. The white dots indicate variants solely called by either the partial (FIGS. 9A & 9B) or the full process (FIGS. 10A & 10B). The black dots indicate variants called in cfDNA by partial (FIGS. 9A & 9B) or the full process (FIGS. 10A & 10B) were concordant with variants in the matching tumor, as called by the conventional method. These variants represented by black dots are hereafter referred to as concordant variants.

Referring specifically to FIGS. 9A & 9B, the variants solely called by the partial workflow pipeline (e.g., white dots) significantly outnumber the concordant variants. In particular, the graph depicting called variants from a sample obtained from a healthy patient (top graph of FIG. 9A) only indicates variants called by the partial workflow pipeline. However, it is likely that a large majority of the called variants from the healthy patient samples are false positives, given that the number of supporting reads detected for those called variants are low (e.g., below 10 supporting reads) as indicated by the box referring to baseline level of noise.

For the samples obtained from breast cancer, lung cancer, and prostate cancer patients, a large number of variants are solely called by the partial workflow pipeline (white dots). Additionally, many of these variants solely called by the partial workflow pipeline have a significant number of supporting reads, indicating a likelihood that they may not necessarily merely be a result of noise (e.g., a false positive). However, it also noted that a significantly higher number of called variants occur at low supporting reads as well. Therefore, calling variants in cfDNA samples using the partial workflow pipeline increases the sensitivity but also decreases the specificity (e.g., higher number of false positives).

Referring specifically to FIGS. 10A & 10B, here, false positive variants identified through the application of the significance model have been removed from each of the graphs. Here, the remaining variants after application of the significance model will be hereafter referred to as true variants. Specifically, a stark contrast is observed between the true variants called from healthy cfDNA samples using the full workflow pipeline (e.g., top graph of FIG. 10A) and the called variants from healthy cfDNA samples using the partial workflow pipeline (e.g., top graph of FIG. 9A). Specifically, a large majority of variants called by the partial workflow pipeline that fell below 10 supporting reads were identified as false positives and eliminated by applying the significance model. Of note, several called variants remain as true variants (e.g., top graph of FIG. 10A) after removal of false positives, which may serve as early detectors and/or predictors of cancer in healthy patients.

Similarly, the individual graphs of FIGS. 10A & 10B that depict true variants from samples obtained from breast cancer (top graph of FIG. 10B), lung cancer (bottom graph of FIG. 10A), and prostate cancer (bottom graph of FIG. 10B) patients also depict the clearance of a large majority of called variants with a low number of supporting reads (e.g., below 10 supporting reads) while maintaining a large number of called variants at higher supporting reads (e.g., 10 supporting reads and above). These maintained called variants shown in each graph indicate the presence of true variants from cfDNA samples that are successfully called using the full workflow pipeline but not called by the conventional method. Therefore, the application of the significance model and removal of false positive called variants as part of the full workflow pipeline avoids a decrease in specificity while maintaining the improvement in sensitivity.

To further establish that the full workflow pipeline results in the identification of true variants at a higher sensitivity, the proportion of called variants using this method was directly compared to variants called using the conventional method. One way of expressing this comparison is by identifying the quantity of concordant true variants (e.g., called by both the full workflow pipeline and conventional method) as a function of either true variants called solely by the workflow pipeline (FIG. 1) or variants solely called by the conventional method.

FIG. 11A depicts the concordant variants detected by both the full workflow pipeline and conventional method in cell free DNA and solid tumor tissue, respectively, as a fraction of the true variants from solid tumor solely called by the conventional method at two different significance levels. This proportion can be expressed as:

$$\frac{\text{(Variants called using full workflow pipeline)} \cap \text{(Variants called using conventional method)}}{\text{(Variants called using conventional method)}}$$

FIG. 11B depicts the concordant variants detected by both the full workflow pipeline and conventional method in cell free DNA and solid tumor tissue, respectively, as a fraction of the true variants from cfDNA solely called by the full workflow pipeline at two different significance levels. This proportion can be expressed as:

$$\frac{\text{(Variants called using full workflow pipeline)} \cap \text{(Variants called using conventional method)}}{\text{(Variants called using full workflow pipeline)}}$$

Of note, for each cancer type (breast, lunch, and prostate) and at both significance levels ($p<10^{-4}$ and $p<10^{-5}$), concordant variants represented a higher percentage of variants solely detected by the conventional method in comparison to true variants solely detected by the full workflow pipeline. In other words, the full workflow pipeline identified more true variants (e.g., higher specificity) in comparison to the number of variants identified by the conventional method. These results further support the basis for identifying true variants in cfDNA samples through the full workflow pipeline in comparison to the conventional method.

ADDITIONAL CONSIDERATIONS

The foregoing detailed description of embodiments refers to the accompanying drawings, which illustrate specific embodiments of the present disclosure. Other embodiments having different structures and operations do not depart from the scope of the present disclosure. The term "the invention" or the like is used with reference to certain specific examples of the many alternative aspects or embodiments of the applicants' invention set forth in this specification, and neither its use nor its absence is intended to limit the scope of the applicants' invention or the scope of the claims.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Any of the steps, operations, or processes described herein may be performed or implemented with one or more hardware or software modules of the apparatus, alone or in combination with other devices. In one embodiment, a software module is implemented with a computer program product comprising a computer-readable medium containing computer program code, which can be executed by a computer processor for performing any or all of the steps, operations, or processes described.

It will be understood that various details of the present invention may be changed without departing from the scope of the present invention. Furthermore, the foregoing description is for the purpose of illustration only, and not for the purpose of limitation.

What is claimed is:

1. A method comprising:
   performing next generation sequencing on a plurality of training samples derived from healthy individuals and on one or more blank samples devoid of nucleotide sequence variants, the next generation sequencing yielding read segments obtained through sequencing cell-free DNA fragments in each sample, and the plurality of training samples including one or more training samples with mean coverage of at least 1,000;
   generating a data table storing for each of a plurality of stratifications a set of parameters that define two or more distributions, the plurality of stratifications including a first stratification inclusive of samples with mean coverage of at least 2,000, generating the data table comprising:
      identifying a baseline noise value using blank samples devoid of nucleotide sequence variants,
      for each stratification, generating the two or more distributions based on the baseline noise value and training samples belonging to the stratification, and
      for each stratification, storing the set of parameters defining the two or more distributions in the data table;

performing next generation sequencing on a test sample yielding a plurality of read segments corresponding to cell-free DNA fragments in the test sample, the plurality of read segments including a target read segment and a read frequency of the target read segment, wherein the target read segment is a candidate variant with one or more mutations informative of cancer relative to a reference genome;

identifying one of the plurality of stratifications for the target read segment based on mean coverage of the test sample;

accessing the set of parameters stored in the data table and specific for the identified stratification of the target read segment;

applying a significance model comprising the two or more distributions defined by the accessed set of parameters to the read frequency of the target read segment to obtain two or more scores;

generating a significance score by combining the two or more scores, wherein the significance score represents a likelihood that the target read segment is confounded by presence of noise; and determining the target read segment as a true positive based on the generated significance score compared to a threshold score.

2. The method of claim 1, wherein the target read segment is a sequence read, an aligned sequence read, a collapsed sequence read, a stitched sequence read, an individual nucleotide corresponding to an identified variant, or any combination thereof.

3. The method of claim 2, wherein reporting the target read segment as a true positive comprises reporting the target read segment as a true positive called variant.

4. The method of claim 2, wherein reporting the target read segment as a true positive comprises reporting the target read segment as a true positive sequence read.

5. The method of claim 2, wherein reporting the target read segment as a true positive comprises reporting the target read segment as a true positive aligned sequence read.

6. The method of claim 2, wherein reporting the target read segment as a true positive comprises reporting the target read segment as a true positive collapsed sequence read.

7. The method of claim 2, wherein reporting the target read segment as a true positive comprises reporting the target read segment as a true positive stitched sequence read.

8. The method of claim 1, further comprising:
extracting features from the target read segment, wherein the identified stratification for the target read segment is based on the extracted features.

9. The method of claim 8, wherein the extracted features are any combination of a depth of coverage, trinucleotide background, percentage of guanine-cytosine nitrogenous bases, mappability, distance of the target read segment from a repeating sequence, type of DNA strand, past evidence of false positives associated with a location of a genome that the target read segment is derived from, and mutation type.

10. The method of claim 1, wherein the identified stratification for the target read segment comprises a partition.

11. The method of claim 10, wherein the partition is based on a trinucleotide context of a nucleotide base in the target read segment.

12. The method of claim 11, wherein the trinucleotide context is one of (1) having either a CGx or xCG context and (2) not having either a CGx or xCG context.

13. The method of claim 10, wherein the partition is based on a range of mean coverage of a nucleotide base in the target read segment.

14. The method of claim 13, wherein the first stratification includes samples with mean coverage between 2,000 and 6,000 reads, and wherein the plurality of stratifications includes a second stratification inclusive of samples with mean coverage less than 2000 reads, and a third stratification inclusive of samples with mean coverage greater than 6000 reads.

15. The method of claim 1, wherein the identified stratification for the target read segment comprises a mutation type.

16. The method of claim 15, wherein the mutation type is one of a nucleotide transversion, transition, oxidation, and cytosine deamination.

17. The method of claim 1, wherein the identified stratification for the target read segment comprises a combination of a partition and a mutation type.

18. The method of claim 1, wherein a first distribution of the significance model is one of a binomial distribution, a negative binomial distribution, a Weibull distribution, a Poisson distribution, a Gaussian distribution, a log normal distribution, an exponential distribution, a geometric distribution, a gamma distribution, a beta distribution, a chi-squared distribution, and wherein a second distribution of the significance model is one of a binomial distribution, a negative binomial distribution, a Weibull distribution, a Poisson distribution, a Gaussian distribution, a log normal distribution, an exponential distribution, a geometric distribution, a gamma distribution, a beta distribution, a chi-squared distribution.

19. The method of claim 1, wherein a first score generated by the significance model represents a likelihood of observing an occurrence of noise in the target read segment in view of a first distribution of the significance model.

20. The method of claim 19, wherein a second score generated by the significance model represents a likelihood of observing a magnitude of the read frequency of the target read segment in view of a second distribution of the significance model.

21. The method of claim 1, wherein, for each stratification, generating the two or more distributions based on the baseline noise value and the training samples belonging to the stratification comprises:
fitting a first regression across a range of read frequencies that includes the baseline noise value to generate a first distribution for the stratification; and
fitting a second regression across a range of read frequencies greater than the baseline noise value to generate a second distribution for the stratification.

22. The method of claim 1, wherein identifying the baseline noise value using the blank samples devoid of nucleotide sequence variants comprises:
receiving a plurality of read frequencies corresponding to read segments obtained from the blank samples; and
generating the baseline noise value based on a mean and standard deviation of the plurality of read frequencies from the blank samples.

23. A system comprising:
a sequencing device configured to perform next generation sequencing on a plurality of training samples derived from healthy individuals, one or more blank samples devoid of nucleotide sequence variants, and a test sample, wherein the next generation sequencing yields read segments obtained through sequencing cell-free DNA fragments in each sample, and wherein the plurality of training samples include one or more training samples with mean coverage of at least 1,000;
a processor; and
a non-transitory computer-readable storage medium with instruction that, when executed by the processor, cause the processor to:
receive read segments sequenced from the plurality of training samples,
generate a data table storing for each of a plurality of stratifications a set of parameters that define two or more distributions, the plurality of stratifications including a first stratification inclusive of samples with mean coverage of at least 2,000, generating the data table comprising:
identifying a baseline noise value using blank samples devoid of nucleotide sequence variants,
for each stratification, generating the two or more distributions based on the baseline noise value and training samples belonging to the stratification, and
for each stratification, storing the set of parameters defining the two or more distributions in the data table;
receive a plurality of read segments obtained through sequencing cell-free DNA fragments in the test sample, the plurality of read segments including a target read segment and a read frequency of the target read segment, wherein the target read segment is a candidate variant with one or more mutations informative of cancer relative to a reference genome,
identify one of the plurality of stratifications for the target read segment based on mean coverage of the test sample,
access a set of parameters stored in a data table and specific for the identified stratification of the target read segment,
apply a significance model comprising two or more distributions defined by the accessed set of parameters to the read frequency of the target read segment to obtain two or more scores,
generate a significance score by combining the two or more scores, wherein the significance score represents a likelihood that the target read segment is confounded by presence of noise, and
determine the target read segment as a true positive based on the generated significance score compared to a threshold score.

24. The system of claim 23, wherein the target read segment is a sequence read, an aligned sequence read, a collapsed sequence read, a stitched sequence read, an individual nucleotide corresponding to an identified variant, or any combination thereof.

25. The system of claim 24, wherein report the target read segment as a true positive comprises report the target read segment as a true positive called variant.

26. The system of claim 24, wherein report the target read segment as a true positive comprises report the target read segment as a true positive sequence read.

27. The system of claim 24, wherein report the target read segment as a true positive comprises report the target read segment as a true positive aligned sequence read.

28. The system of claim 24, wherein report the target read segment as a true positive comprises report the target read segment as a true positive collapsed sequence read.

29. The system of claim 24, wherein report the target read segment as a true positive comprises report the target read segment as a true positive stitched sequence read.

30. The system of claim 23, wherein the instructions further cause the processor to:
extract features from the target read segment, wherein the identified stratification for the target read segment is based on the extracted features.

31. The system of claim 30, wherein the extracted features are any combination of a depth of coverage, trinucleotide background, percentage of guanine-cytosine nitrogenous bases, mappability, distance of the target read segment from a repeating sequence, type of DNA strand, past evidence of false positives associated with a location of a genome that the target read segment is derived from, and mutation type.

32. The system of claim 23, wherein the identified stratification for the target read segment comprises a partition.

33. The system of claim 32, wherein the partition is based on a trinucleotide context of a nucleotide base in the target read segment.

34. The system of claim 33, wherein the trinucleotide context is one of: (1) having either a CGx or xCG context and (2) not having either a CGx or xCG context.

35. The system of claim 32, wherein the partition is based on a range of mean coverage of a nucleotide base in the target read segment.

36. The system of claim 35, wherein the first stratification includes samples with mean coverage between 2,000 and 6,000 reads, and wherein the plurality of stratifications includes a second stratification inclusive of samples with mean coverage less than 2000 reads, and a third stratification inclusive of samples with mean coverage greater than 6000 reads.

37. The system of claim 23, wherein the identified stratification for the target read segment comprises a mutation type.

38. The system of claim 37, wherein the mutation type is one of a nucleotide transversion, transition, oxidation, and cytosine deamination.

39. The system of claim 23, wherein the identified stratification for the target read segment comprises a combination of a partition and a mutation type.

40. The system of claim 23, wherein a first distribution of the significance model is one of a binomial distribution, a negative binomial distribution, a Weibull distribution, a Poisson distribution, a Gaussian distribution, a log normal distribution, an exponential distribution, a geometric distribution, a gamma distribution, a beta distribution, a chi-squared distribution, and wherein a second distribution of the significance model is one of a binomial distribution, a negative binomial distribution, a Weibull distribution, a Poisson distribution, a Gaussian distribution, a log normal distribution, an exponential distribution, a geometric distribution, a gamma distribution, a beta distribution, a chi-squared distribution.

41. The system of claim 23, wherein a first score generated by the significance model represents a likelihood of observing an occurrence of noise in the target read segment in view of a first distribution of the significance model.

42. The system of claim 23, wherein a second score generated by the significance model represents a likelihood of observing a magnitude of the read frequency of the target read segment in view of a second distribution of the significance model.

43. The system of claim 23, wherein, for each stratification, generating the two or more distributions based on the baseline noise value and the training samples belonging to the stratification comprises:

fit a first regression across a range of read frequencies that includes the baseline noise value to generate a first distribution for the stratification; and fit a second regression across a range of read frequencies greater than the baseline noise value to generate a second distribution for the stratification.

44. The system of claim 23, wherein identifying the baseline noise value using the blank samples devoid of nucleotide sequence variants comprises:

receiving a plurality of read frequencies corresponding to read segments obtained from blank samples; and generating the baseline noise value based on a mean and standard deviation of the plurality of read frequencies from blank samples.

* * * * *